United States Patent [19]
Shimizu et al.

[11] Patent Number: 5,737,541
[45] Date of Patent: Apr. 7, 1998

[54] BOX FOR FUNCTIONAL EXPANSION OF A PORTABLE ELECTRONIC EQUIPMENT

[75] Inventors: Hisao Shimizu; Shoichi Sunagawa; Hidemi Dohi; Yoshiaki Matsuoka; Yoshio Tanioka; Norimitsu Asano, all of Tottori, Japan

[73] Assignees: Sanyo Electric Co., Ltd., Osaka-fu; Tottori Sanyo Electric Co., Ltd., Tottori-ken, both of Japan

[21] Appl. No.: 413,777

[22] Filed: Mar. 30, 1995

[30] Foreign Application Priority Data

| Mar. 30, 1994 | [JP] | Japan | 6-061352 |
| May 20, 1994 | [JP] | Japan | 6-107143 |
| May 23, 1994 | [JP] | Japan | 6-108546 |
| May 24, 1994 | [JP] | Japan | 6-109893 |
| May 24, 1994 | [JP] | Japan | 6-109894 |
| Nov. 21, 1994 | [JP] | Japan | 6-286647 |

[51] Int. Cl.⁶ .................... G06F 1/16; G06F 13/00
[52] U.S. Cl. ........................... 395/281; 361/725
[58] Field of Search ............. 395/281; 364/708.1; 361/683, 686, 725, 679; 439/358

[56] References Cited

U.S. PATENT DOCUMENTS

| 5,290,178 | 3/1994 | Ma | 439/652 |
| 5,310,358 | 5/1994 | Johnson et al. | 439/358 |
| 5,313,596 | 5/1994 | Swindler et al. | 395/281 |
| 5,347,425 | 9/1994 | Herron et al. | 361/683 |
| 5,477,415 | 12/1995 | Mitcham et al. | 361/686 |
| 5,526,493 | 6/1996 | Shu | 395/281 |
| 5,535,093 | 7/1996 | Noguchi et al. | 361/686 |
| 5,552,959 | 9/1996 | Penniman et al. | 361/686 |
| 5,604,663 | 2/1997 | Shin et al. | 361/686 |

*Primary Examiner*—Glenn A. Auve
*Attorney, Agent, or Firm*—Darby & Darby

[57] ABSTRACT

A docking station box for functional expansion of portable electronic equipment that has a table with a vertically upstanding back wall to which is mounted a part of a connector corresponding to a connector part of the electronic equipment. The box includes at least one hook that is moved from a position below the table to one above the table to engage the electronic equipment to mount it securely thereon. The docking station box also includes a mechanism for thrusting the electronic equipment away from the position in which the connector parts of the box and the electronic equipment are engaged.

31 Claims, 42 Drawing Sheets

BOX FOR FUNCTIONAL EXPANSION OF A PORTABLE ELECTRONIC EQUIPMENT

BACKGROUND OF THE INVENTION

1. Field of the Invention

At present, electronic equipment such as personal computers are made as small as possible in order to use them in usual business practices, and they are called lap top type, notebook type, sub-notebook type. Portable electronic equipment of these types have minimum necessary functions, for example input, calculation, storage, display of data, to make them portable.

With the large increase of data, it is attempted to practice the selection, processing, and output of these data by multi media. In order to introduce multi media, the electronic system is required to perform various functions, and in case of portable electronic equipment above mentioned, the functions of the equipment are expanded by communication with other electronic equipment which is provided with different or expanded functions from the former.

2. Description of the Prior Art

One of the ways which expands the functions of a portable electronic equipment is that it is connected with the other electronic equipment, such as a printer, a CRT, a disk driver, a computer system of the desk top type, by an interface cable having a male or a female connector at each end.

In this way, there is a problem that the connection of the equipment and the interface cable takes much labor, time and difficulties. Therefore, recently, as shown in Japanese Utility Model Laid Open Gazette 86920/1992, boxes of various types for functional expansion of a portable electronic equipment, to which a portable electronic equipment is directly connected without any interface cable, have been proposed.

A box sometimes called a "docking station" for functional expansion of a portable electronic equipment of one type is provided with a horizontal table at the upper face of the box, a half of a connector for connecting with another half installed on the portable electronic equipment on the rear end of the table, a recess formed at the front end of the table, which is opened to front side and top side, and a retractable tongue projected horizontal in the recess, which is retracted in the box at loading and unloading of the equipment. In this specification, the half of connector means one of connectors, either the male connector or the female connector, of the connector that comprises a pair of the male connector and the female connector. If the one-half of the connector is the female, for example, the other is the male.

A portable electronic equipment of above mentioned type is required to have a projecting hook which is pushed into the recess when it is mounted on the table, resulting in that the portability of the equipment is reduced.

A box for functional expansion of a portable electronic equipment of a different type is provided with an inclined face on which the rear part of a portable electronic equipment is put, a back board placed at a right angle with the inclined face from its rear end, a pair of cams pivoted to the box behind the backboard, being swung in front of backboard to move the equipment to and from the backboard, and a pair of projections on the inclined table, forming a hook nose which upper part is elongated forward, as shown in japanese utility Model Laid Open Gazzet 86920/1992.

A box of this type is not reduced in portability because of the lack of the hook projecting from the surface of the equipment, but its shape is complicated forming a pair of apertures for admitting the movement of the cams and a pair of holes or apertures for hooking the projections.

A box for functional expansion of a portable electronic equipment of a further different type is provided with a table, on which an equipment is mounted, and guide pins are erected on the table rectangularly, so as to mount and demount the equipment on the table in the direction of the axis of the pins. But, this type of box cannot prevent accidental disconnection caused by drawing the equipment out of the box in the direction of guide pins' shaft.

A box for functional expansion of a portable electronic equipment of a further different type is provided with a table, on which an equipment is mounted, one half of a connector that is provided on the one side of the table, a pin projected over the top of the table and reciprocated laterally, a lockup mechanism which can retain the pin at the position where the equipment and the box are coupled by the connector, and a release lever for breaking the lockup function of lockup mechanism. A box of this type is further provided with a means for prohibiting manipulation of a release lever during the time the equipment is loaded and switched on from a power source.

According to the box of this type, the pin is inserted into the bottom of the portable of electronic equipment when the equipment is put on the table, and after that, the connector is coupled by sliding the equipment with the pin laterally, and the equipment is coupled together by the pin and a lockup mechanism. When the release lever is manipulated to disconnect the lockup mechanism, the equipment will be moved in a reverse lateral direction and be disconnected from the connector.

According to a box of this type, accidental disconnection of the coupled connector is prevented by locking up of the pin, but it may occur that the connector is wrenched and disconnected by lifting of the equipment coupled to the box.

SUMMARY OF THE INVENTION

Therefore, the present invention is aimed to offer a box for functional expansion of a portable electronic equipment which makes the loading and unloading of the equipment on the box easier, and which prevents disconnection of a coupled connector by any improper force and, on the other hand, which makes the shape of the equipment simple.

The present invention is adapted to a box for functional expansion of a portable electronic equipment, which is provided with a primary box, having a horizontal table for mounting a portable electronic equipment thereon, a vertical wall standing behind the table, and a half of a connector installed at the vertical wall for connection with the equipment.

At the back board of the equipment, a mating half of the connector to the one installed on the vertical wall is installed so that the connector will be coupled when the equipment on the table is slid backward, and disconnected when it is slid forward.

In order to realize the aims aforementioned in such a box for functional expansion of a portable electronic equipment, according to the present invention, at least one hook is located in front side of the half and pivoted on the table, or primary box, about a lateral shaft rotatable between the releasing position lower than the table and the hooking position projecting its hook nose over the table. The nose of the hook can be turned backward in hooking position.

According to the present invention, the primary box is required to be provided with a means for operating the hook, and the table is required to be provided with at least one opening opened through it for admitting the nose of said hook to move through it between the releasing position and the hooking position.

The hook is located in the releasing position before the equipment was mounted on the table.

The equipment is mounted on the table and pushed backward to connect with the box. The loading of the equipment is completed when the connector is connected, after which the equipment is ready to communicate with the primary box.

After the loading of the equipment, the hook is raised to the hooking position and the nose is inserted on the rear edge of the hole formed through the bottom board of the equipment, to restrain the equipment vertically.

The lifting up of the equipment is stopped in such manner in front of the connector so that disconnection of the coupled connector by a wrenching force originated from the lifting up of the equipment is prevented.

The equipment is unloaded by the reverse way to the loading, in the way, firstly the hook is moved to the releasing position, then the equipment is pulled backward, and after then, the equipment is taken up from the table.

As mentioned above, according to the present invention, the loading and unloading of the equipment is easier and more secure in the manner of pushing it on the table forward for loading, and pulling it forward from the loading position. Moreover, the shape of the equipment is made simple for it is required to have holes to correspond to the hooks at the bottom board thereof.

The means for operating the hook is preferably provided with a manipulation member, such as a lever, a slider, or a dial, for manipulating it from outside of the primary box. And the means for operating is more preferably provided with a retraining means which retains the manipulation member at the position where the hook is located at the hooking position for keeping the hook at the hooking position during loading of the equipment. Further, the means for operating is most preferably provided with a lockup mechanism which locks up the retraining means at the position where the means is inoperative and which can be disconnected by a particular user, in order to cease any unauthorized removal of the box.

According to the present invention, the primary box is preferably provided with a thrusting mechanism which pushes the equipment from the loading position, where the connector is connected, to the disconnecting position where the connector is disconnected.

The thrusting mechanism is provided with a mechanism that thrusts the equipment on the table from the loading position to the disconnecting position, but it is preferable that it will not move the equipment up and down for preventing the connector from improper force in the course of thrusting.

For example, it is preferable that the vertical wall is provided with at least one opening formed through it, and that the thrusting mechanism is provided with at least one pusher sliding longitudinally through the opening between a waiting position where its front end is abreast with the front face of the vertical wall and a projecting position where its front end is projected forward from the front end of the half, a shaft supported by the primary box behind the vertical wall rotatably about a lateral axis, at least one crank arm to connect the pusher with the shaft, and another end to the pusher, and a manipulation member, such as a lever, a slider, a dial, for manipulating the mechanism from out side of the primary box.

The thrusting mechanism is preferable to have a plurality of pushers for thrusting the equipment stably, and especially the half installed at the vertical wall, is preferable to be located between two pushers.

According to the present invention provided with the thrusting mechanism, when the equipment is thrusted by the mechanism, it will be moved forward straight, without wrenching about a vertical axis, from the loading position to the disconnecting position, and the connector is disconnected smoothly and stably, and the connector is prevented from disconnection or damage by wrenching about a vertical axis.

It is preferable to keep the pusher of the thrusting mechanism at the projecting position before the equipment is mounted on the table in order to prevent the equipment and the box from loading of the equipment in the wrong way. And in order to improve the convenience for users, the thrusting mechanism is preferably inter-linked with the means for operating the hook, so as to move the hook from the releasing position to the hooking position after the pusher was pushed back to the waiting position by pushing back the equipment on the table mounted in front side, and the thrusting mechanism to thrust the equipment from the loading position to the disconnecting position after the hook was moved from the hooking position to the releasing position.

In this case, the manipulation member of the means for operating hook can be used also as well as that of the thrusting mechanism.

By the way, portable electronic equipment, such as personal computers, in the present marked are varied in their sizes, such as lap top type, notebook type and so on. Further, the notebook type is varied as to A4 type, B5 type, sub-notebook type and so on.

The present invention is adaptable to not only load an equipment of one a particular type, but also of any type selected from several types.

To make a table to carry an equipment of any type selected from several types, the areas for every type may occupy the table individually. But, for making the table small, it is preferable that an area for a small equipment is located over the area for a larger one, partially or totally.

According to the present invention, so as to be used with an equipment of any type selected from several types, the primary box is provided with at least one other half of a different connector, supported by a retraction mechanism installed in the primary box to made it retractable from the utilizing position above the table at proper lateral and longitudinal spacings with the one installed at the vertical wall to a retracted position under the table and/or behind the vertical wall. The retraction mechanism is contrived to move a half between the utilizing position and the retracted position linearly or rotationally.

For example, a retraction mechanism which moves a half rotationally is provided with the second rotary shaft supported by the primary box rotatably about a lateral axis, at least one crank arm, one end of which is fixed to the second rotary shaft, and another end of which is supporting a retractable half, and a means for operating this mechanism.

The means for operating this mechanism may be electromotive, but, taking account of that the mechanism is not often operated, it is preferable that the means comprises a manual member which operates the second rotary shaft from the outside of the box, such as a slider, a lever, a dial, and so on.

According to the present invention adaptable with equipment of several types, it is preferable to confirm whether the box is ready to load an equipment mounted on the table or not. Of course, it is possible to confirm this by the user's own eyes. But, it is preferable to improve the convenience for users so that the confirmation is carried out automatically and the result informed to the user.

To confirm the correspondence of the equipment and the half and to inform the result to an user, for example, the primary box is preferably provided with a first detecting means for detecting the type of the equipment mounted on the table in front side of the halves, a second detecting means for detecting the half located foremost above the table, and an information means for informing the correspondence of the detected equipment and the detected half when they correspond with each other.

In this manner, the type of the equipment is detected by the first detecting means when an equipment is mounted on the table, and checked with the half detected by the second detecting means, then, the information means will tell the correspondence between them when they correspond with each other. As the result, a user can confirm that the box is ready for the connection with the equipment on the table before he connects them, and the mismatching of the equipment will be prevented.

The first detecting means is satisfied with a contrivance which can detect the type of the equipment mounted on the table, for example, which is provided with a switch, such as a micro-switch, switches nearby, and so on, or a sensor such as a photo sensor located in the area covered by a larger equipment and uncovered by a smaller equipment.

The switch or sensor may be operated by an equipment directly, or by a stopper which locates a smaller equipment on the table, projecting over the top of the table, and which is depressed under the top of the table by a larger equipment on the table.

The second detecting means can be a contrivance which can detect the foremost half above the table, for example, which is provided with a switch or a sensor operated by the retraction mechanism.

The information means may inform of the correspondence of the equipment and the half visually by lighting, blinking, change of color, and/or auditory by a buzzer, a bell, chime, voice or sound synthesizer.

According to the present invention adaptable with the selected equipment from several different types, it is also preferable to have a thrusting mechanism which can push an equipment of any type loaded to the box from the loading position to the disconnecting position.

The thrusting mechanism for a box of this type is not required to push only an equipment connected with the connector half installed on the vertical wall, but the one connected with the other retractable half.

Therefore, for example, the thrusting mechanism is provided with at least one holder for a retractable connector half, supported by a retracting mechanism, at least one supplementary pusher for a connector half, supported slidably in the direction of insertion and extraction of the connector between a waiting position where its front end is even with the front end of the holder to a projecting position where its front end is projected forward from the front end of the retractable half, and a spring biasing the supplementary pusher toward its waiting position.

And the mechanism is provided with at least the same number of primary pushers to the connector halves, supported slidably in a longitudinal direction between a position where its front end is even with the front face of the vertical wall and a position where its front end is projected forward from the half installed on the vertical wall.

Further, the same number of the primary pushers to the supplementary pushers are located at the back of a corresponding supplementary pusher located above the table, so that the primary pusher will push the supplementary pusher and so that the supplementary pusher will push the equipment forward from the loading position to the disconnecting position.

Furthermore, the mechanism is provided with a rotary shaft supported by the primary box rotatably about a lateral axis behind the vertical wall, and at least the same number of crank arms to the primary pushers connecting each primary pusher with the shaft, and the manipulation member for operating the mechanism from the out-side of the primary box, such as a slider, a dial, a lever and so on.

It is preferable that the supplementary pushers are located on both lateral sides of the retractable connector for thrusting the equipment smoothly and stably and preventing the retractable connector from improper force during the unloading of the equipment.

According to the present invention, the table may be fixed with the primary box, but it is preferable that the table is supported slidably in longitudinal direction, and that the equipment is restrained at a place on the table in longitudinal and lateral direction for making it easier and more efficient to load and unload the equipment.

In this manner, the equipment is mounted on the predetermined location of the table, then loaded by pushing it backward to the loading position together with the table, and unloaded by pulling it forward from the loading position together with the table.

According to the present invention, in the case that the table is slidable, it is the same as in the case to make at least one hook to be pivoted to the table or the primary box under the table and be able to move between a releasing position under the top of the table and a hooking position projecting its nose over the table rotatably about a lateral shaft, is formed through the table.

However, in order to improve the convenience for users by making the hook to be engaged and disengaged automatically in accordance with the movement of the table, it is preferable that the hook is pivoted to the primary box, and that the opening for admitting the motion of the hook and a hole formed on the equipment are preferably located over the hook when the table with the equipment on it is located on the loading position, so as to be inserted the nose of the hook on the rear edge of the opening and the hole at the loading position.

In this manner, when the table had been moved to the loading position and the hook is stood up to the hooking position from the releasing position through the aperture, the table is restrained vertically. And when the table is pulled forward for unloading of the equipment, the hook is pushed down and into the releasing position under the table by the rear edge of the opening, and after then the equipment will be able to be removed from the table freely.

In case of that the table being supported slidably by the primary box, in order to prevent the table from an accidental forward movement, the table is preferably to be restrained at the loading position by the stopping means from the loading position by the stopping means for restraining the table at the loading position assembled between the primary box and the table, and to be disconnected from the restraint by tripping means which is provided in the primary box.

The stopping means may be provided with a recess formed on one of the primary box and the table, a projection formed on the other, and the tripping means may be constructed to move the recess or projection formed on the other to and from the opposing one.

For example, the stopping means may be provided with a recess formed on the right or left side of the table having a cantilever with a corresponding projection at its free end, being pivoted on the primary box notable about a vertical axis, and a spring biasing the projection to the recess.

As this stopping means may be disconnected by moving of the projection from the recess, the tripping means may be associated only with the cantilever, or with it and an electric device, such as a solenoid or a motor, for driving it.

In case the table is supported slidably on the primary box, it is also preferable that the box is provided with a thrusting mechanism which pushes an equipment from the loading position to the disconnecting position for making the unloading of the equipment easier and more effective. The form of the thrusting mechanism may be similar to that aforementioned.

According to the present invention where the table is supported slidably on the primary box, and is provided with a stopping means, a tripping means and a thrusting mechanism, it is preferable that the stopping means be prevented from being disconnected while the table is kept in the loading position, and disconnected when the manipulation of the thrusting mechanism is started for thrusting the equipment, in order to prevent any unwanted disconnection of the equipment and to thrust the equipment from the loading position to the disconnecting position smoothly.

It is possible to realize this by having the manipulation member of the thrusting mechanism supported by the primary box to move between a waiting position where the stopping means is restrained effectively when the manipulation member is first actuated and an effective position where the thrusting mechanism can be manipulated effectively upon releasing from the restraint by the member, and making the stopping means to be moved automatically formed on it, for example, by biasing the manipulation member to the waiting position by a spring and moving the manipulation member to its effective position.

It is preferable for promoting the forward motion of the table by at least one spring connected between the primary box and the table, and in this case, the primary box is preferably provided with at least one stopper which stops the forward extraction of the table from the primary box.

In case of that a slidable table is biassed forward by at least one spring, it is preferable to damp the forward motion of the table by a damper system for preventing the equipment and the stopper from shocks by stopping the motion of the table at its foremost position, especially when the table is vacant. And the damper system is preferable to be ineffective while the table is moving backward to reduce the resistance against the backward motion of the table, especially against its backward motion when the equipment is mounted on the table.

According to the present invention, it is possible to load an equipment of any type selected among several different types, even in the case that the table is supported slidably by the primary box.

Of course, to make it possible that the equipment can be selected from several types to be mounted on the slidable table, it is preferable that the table be provided with several means for locating an equipment of each type. In case of the area for a small equipment is located over that for a large one partially or totally, a part or parts of the means for locating an equipment of small type in the area for large one are formed to move up and down between a position projecting their tops over the table for locating a small one and a position depressed with their tops under the table by a weight of a large one for loading the large one without interference.

According to the present invention, for the prevention of unauthorized use, the box is preferably connected with a particular electronic equipment which is provided with a means for self detecting of the mounting on the table, a power switch for equipment booting, a means for supplying requiring signals of booting (PWR-ON) when the power switch is operated to require booting to the box by the connector while the means is mounted on the table, a means for booting which boots the equipment when the input of authorizing signals of booting (SYS-ON) supplied from the box by the connector after it had supplied PWR-ON, and the primary box is preferably to be provided with a lockup mechanism which can be dissolved by a particular user, and a means for security which supplies SYS-ON when the PWR-ON is input from the equipment.

Furthermore, the primary box is preferably provided with a detachable CRT table on it covering over the equipment in order to mount a CRT.

The foregoing and other objects, features, aspects and advantages of the present invention will become more apparent from the following detailed description when taken in conjunction with the accompanying drawings.

BRIEF DESCRIPTION OF THE DRAWINGS

The preferred embodiments of the present invention will be mentioned in detail hereinafter referring to the annexed drawings, wherein.

DETAILED DESCRIPTION OF PREFERRED EMBODIMENTS

Now, referring to FIGS. 1 to 4, an embodiment of the present invention is provided with a primary box (docking station) 1, in which some of such functional parts which perform different functions from that of an electrical equipment, that is a portable personal computer (PC) 2, or expanded functions of it, as semiconductor circuits, driving circuits for CD-ROM or the likes, audio devices such as a spearer, power system for driving, and so on.

The primary box 1 is provided with a horizontal table 3 to which is fixed one piece a vertical wall 4 behind the table 3, and a half 5a of a connector 5 installed in the vertical wall 4.

The PC 2 is mounted on the table 3 and is pushed forward to communicate with the primary box 1 through the connector 5, and pulled backward to disconnect it.

Figure 2:
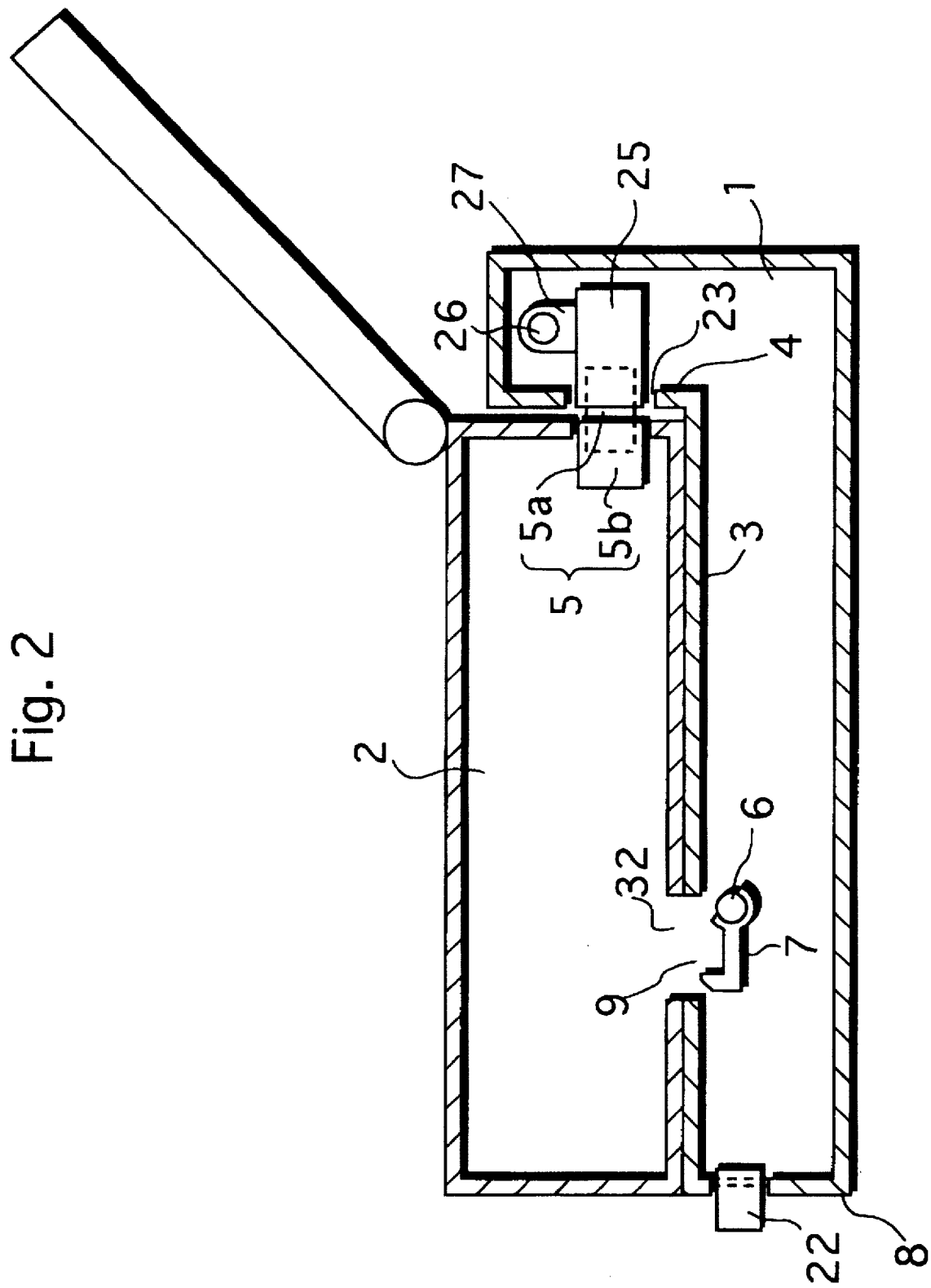
FIG. 2 is a longitudinal sectional view of the embodiment, in which a hook is located at the releasing position.
Figure 3:
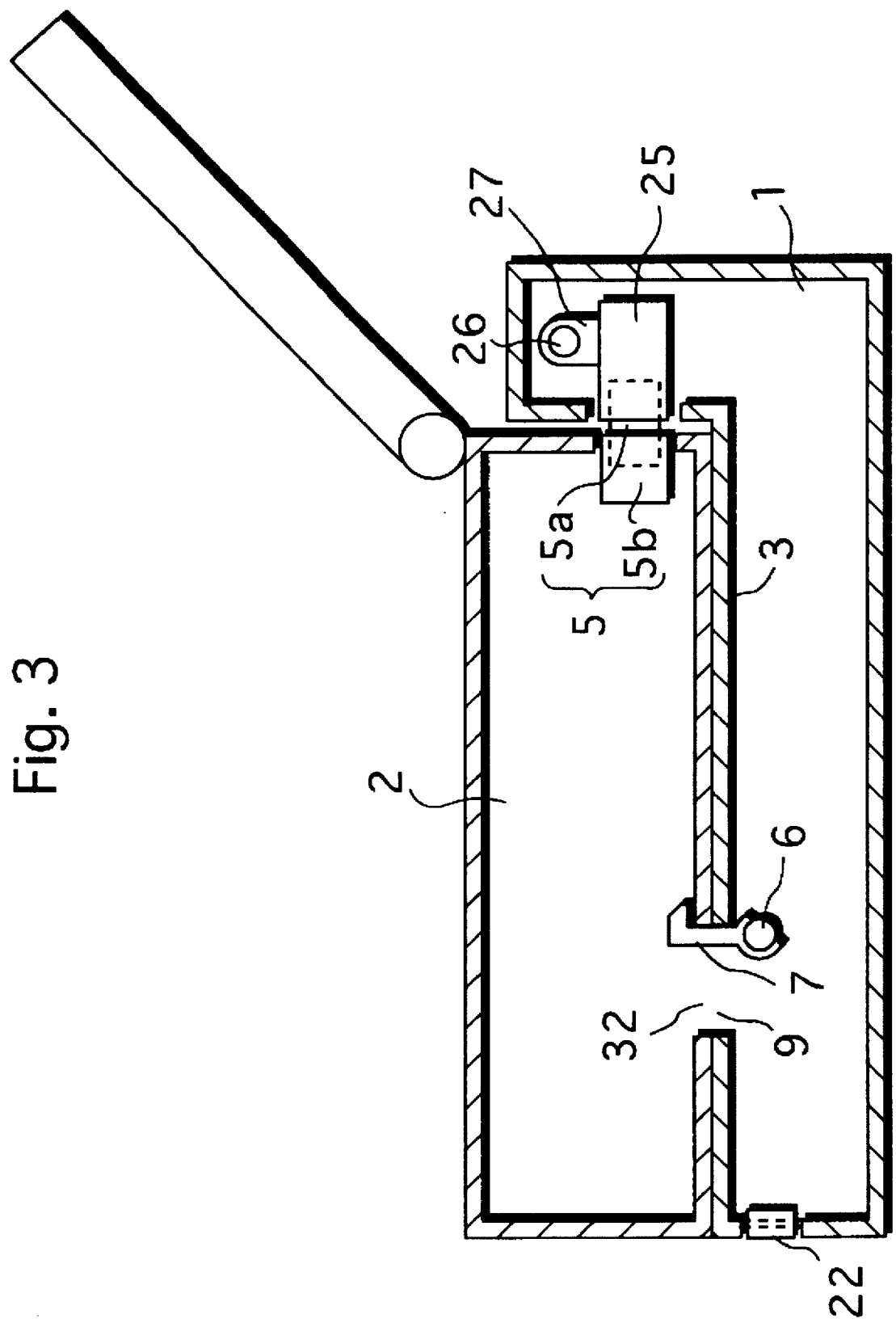
FIG. 3 is a longitudinal sectional view of the embodiment, in which the hook is located at the hooking position.

In the primary box 1, a first rotary shaft 6 elongated laterally is supported rotatably about its lateral axis under the table 3 near the front wall of the primary box 1. A pair of hooks 7 is fixed near the shaft ends so that the hooks 7 are rotated between a releasing position under the table 3 as shown in FIG. 2 and a hooking position where their hook noses are projected over the table 3 as shown in FIG. 3 through openings 9 formed through the table 3.

The hooks 7 are biased toward a hooking position and moved to the releasing position by a manipulation means 10 as follows.

Figure 5:
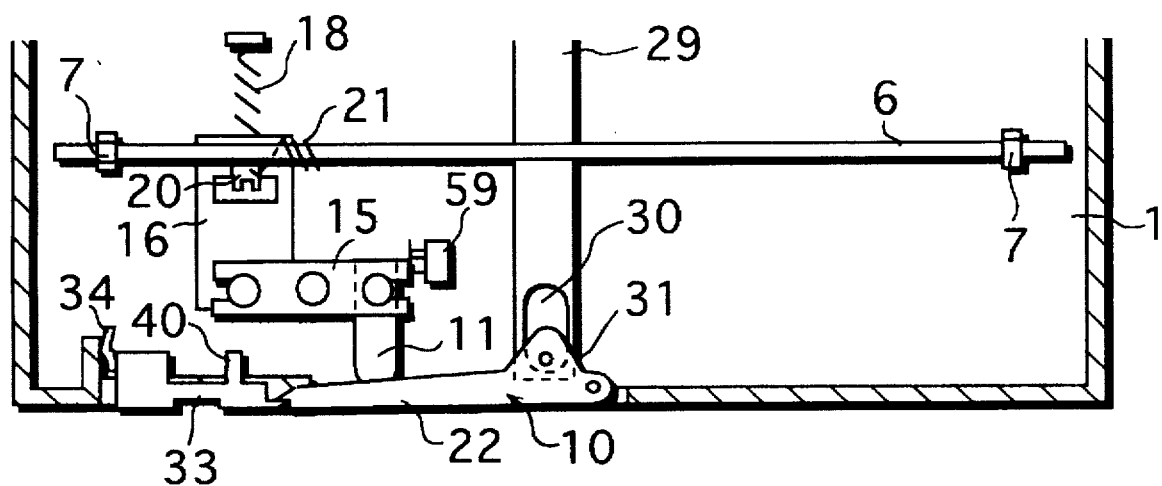
FIG. 5 is a fragmentary plan view of the thrusting mechanism of the embodiment shown in the condition when the manipulation member is restrained.
Figure 6:
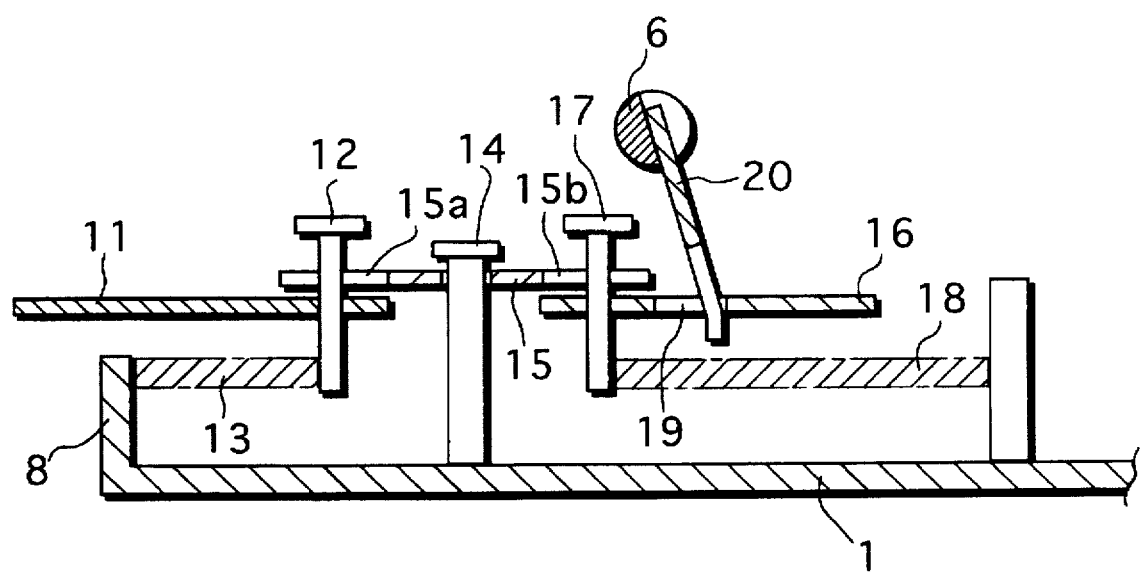
FIG. 6 is a fragmentary side view of a means for manipulation relating to the embodiment when hooks are located at their releasing position.
Figure 7:
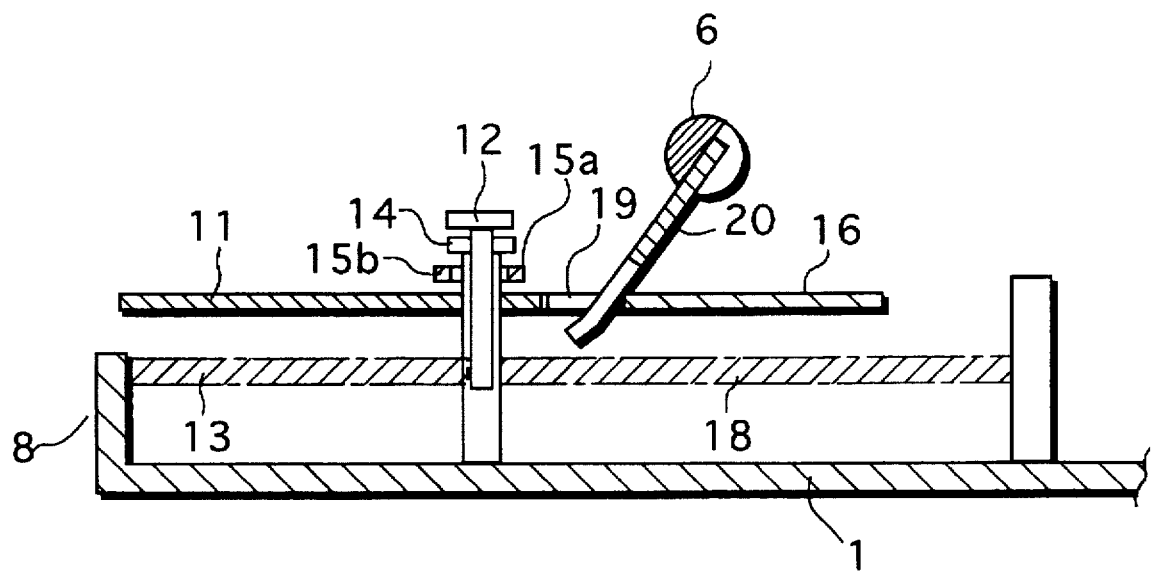
FIG. 7 is a fragmentary side view of a means for manipulation relating to the embodiment when hooks are located at their hooking position.
Figure 8:
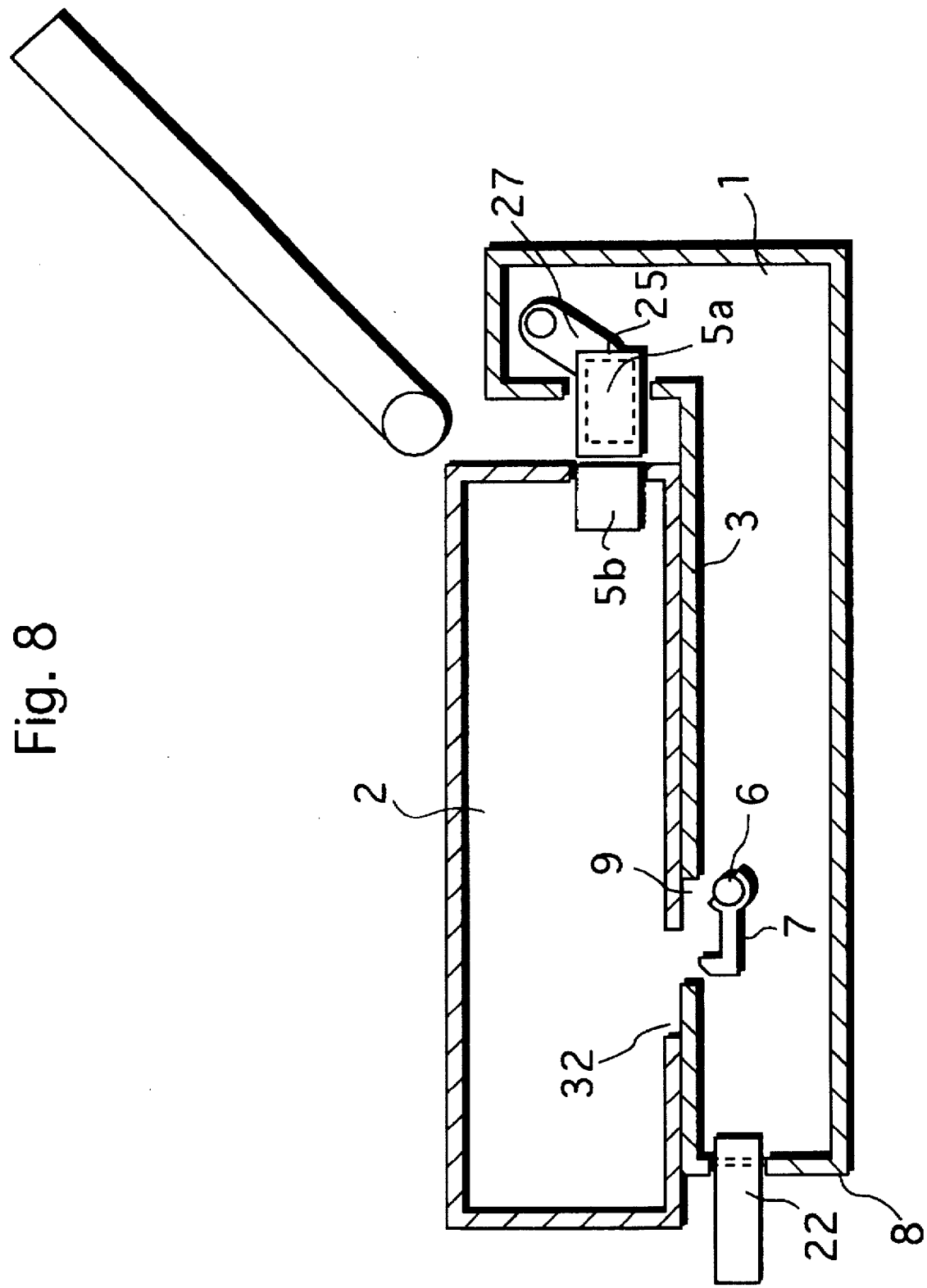
FIG. 8 is a longitudinal sectional view of the preferred embodiment shown in a condition when an equipment is pushed out to its disconnecting position.

As shown in FIGS. 5 and 6, the manipulation means 10 has a first sliding plate 11 which is longtitutably supported from a position where its fore end is projected in front of the primary box 1 to a retracted position where the fore end is retracted into the primary box 1. There also is a first joint pin 12 which upstanding on the rear part of the plate 11, and a traction spring 13 which is connected with the joint pin 12 at one end and the front wall 8 of the primary box 1 at the other end.

Figure 1:
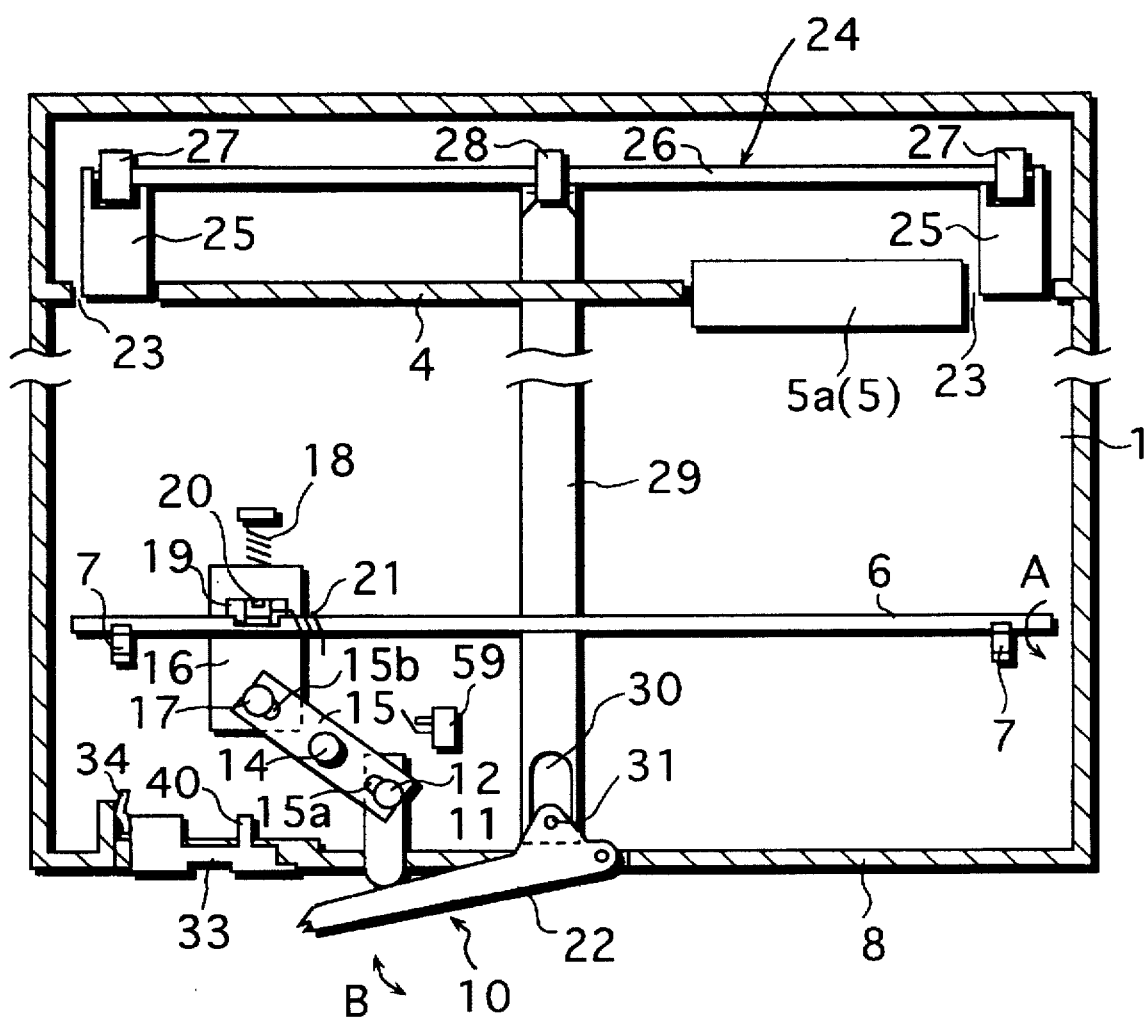
FIG. 1 is a cross-sectioned plan view of the preferred embodiment of the present invention with an electronic equipment.

As shown in FIG. 1, the manipulation means 10 has a pivot pin 14 mounted in the bottom of the primary box 1 at the left side of the space where the rear part of the plate 11 travels, and a swing lever 15 which is rotatably supported by the pivot pin 14 at its center, having a groove 15a in one end, through which the first joint pin 12 is inserted rotatably and slidably, formed through its one end.

Further, the manipulation means 10 has the second sliding plate 16 which is supported to be slidable in a longitudinal direction, and another joint pin 17 penetrating the front part of the sliding plate 16. This joint pin 17 is inserted rotatably and slidably through another groove 15b formed through the other end of the swing lever 15, so that, both of the sliding plates 11, 16 are moved in the opposite direction to each other.

The joint pin 17 on the second plate 16 is connected with another traction spring 18 which biases the joint pin 17 backward, thereby to prevent rapid backward movement of sliding plates 11 and 16.

Near the rear end of the second sliding plate 16, an aperture 19 is opened through it, and the bottom end part of a transmission tongue 20 on the first rotary shaft 6 is inserted in the aperture 19. The first rotary shaft 6 is biased in direction indicated by an arrow A in FIG. 1, i.e., in which the bottom end part of the transmission tongue 20 is received by the rear edge of the aperture 19, by a torsion spring 21 which is coiled around the shaft 6 and received by the transmission tongue 20 at one end and by the primary box 1 at the end.

The manipulation means 10 is provided with a lever 22 for manipulation, having one end pivoted on the front wall 8 of the primary box 1 rotatable about a vertical axis at the one end to swing in front of the primary box 1.

Figure 4:
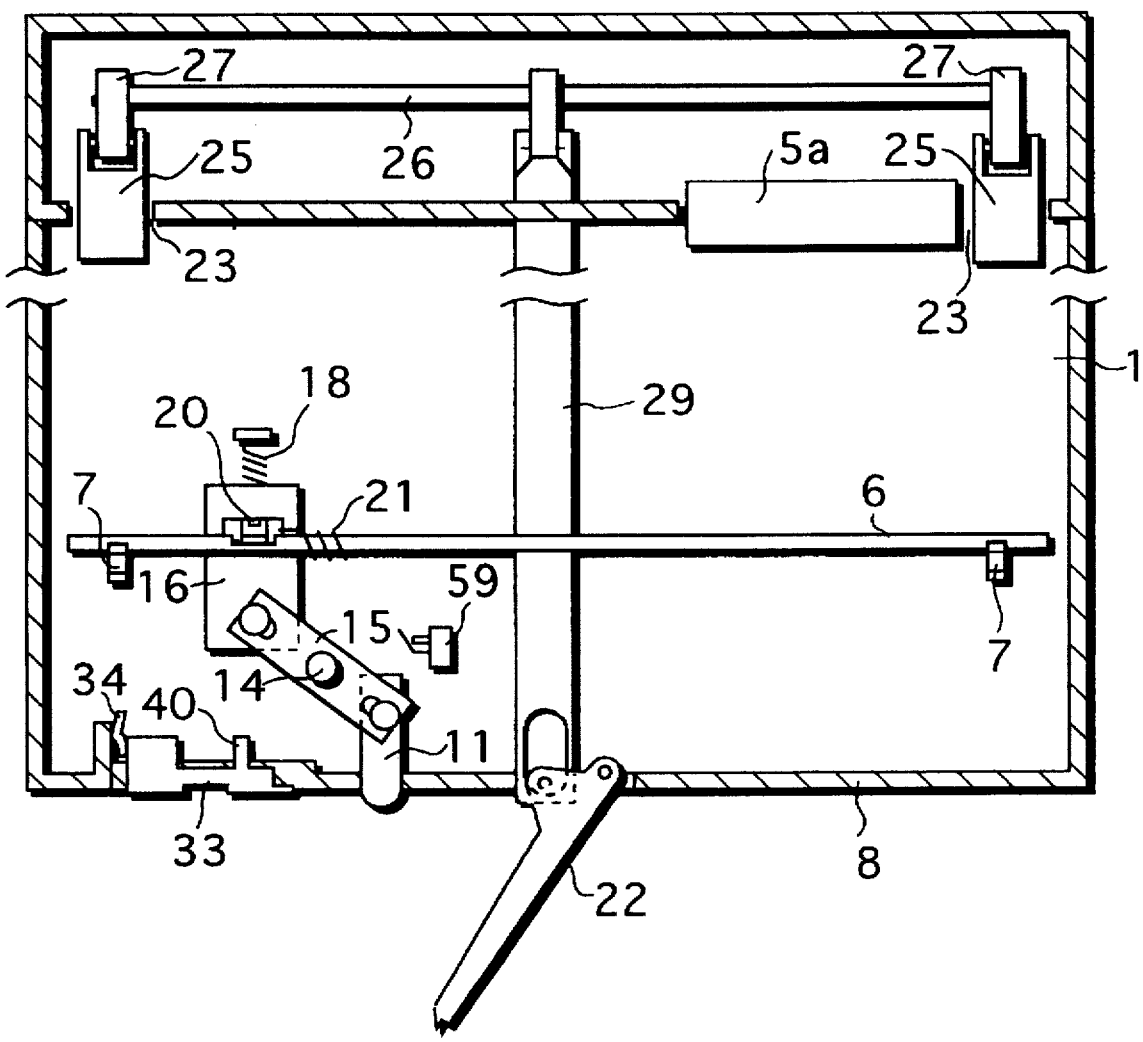
FIG. 4 is a cross-sectioned plan view of the embodiment, in which pushers are extended from the vertical wall.

As shown in FIG. 4, when the free end of the lever 22 is moved outwardly from the primary box 1 further than a certain distance, the first sliding plate 11 is in its foremost position, the second sliding plate 16 is in its rear most position, and the hooks 7 is in its releasing position.

As shown in FIG. 1, when the free end of lever 22 is moved outwardly from the primary box 1 by a certain distance, the lever 22 is received by the first slide plate 11.

As shown in FIG. 5, when the lever 22 is pushed to lay along the primary box 1, the first sliding plate 11 is toward the front wall of the primary box 1, and the second sliding plate 16 is moved forward, to rotate the shaft 6 in the opposite direction to that indicated by an arrow A in FIG. 1. It places the hooks 7 fixed on the ends of rotary shaft 6 to be located in the hooking position.

As shown in FIG. 1, two apertures 23 are formed at the bilateral end parts of the vertical wall 4, and a pusher 25 of a thrusting mechanism 24 is inserted through each opening 23 slidably in the longitudinal direction. The second rotary shaft 26 elongated laterally is supported by the primary box 1 rotatably about a lateral axis behind the vertical wall 4 above the pushers 25, and the pushers 25 are connected by crank arms 27 individually with the rotary shaft 26.

Another crank arm 28 is connected to the center of the rotary shaft 26, and the rear end of the slide beam 29 which is supported under the table 3 by the primary box 1 slidable in its longitudinal direction is connected with the bottom end of the crank arm 28.

An oval opening 30 elongated longitudinally is formed through the sliding beam 29 at the front end, and another pin 31 fixed midway of the lever 22 for manipulation is inserted in this oval opening 30, so as to move the sliding beam 29 forward when the free end of lever 22 is moved outwardly from the primary box more than a certain distance, and the pushers 25 are moved from the waiting position where the front end of each of them are flush with the vertical wall 4 to the thrusting position where the front end of the pushers are projected forward of the connector half 5a, being moved with the crank arm 28, the shaft 26 and the crank arms 27.

In the state that the pushers 25 are located in the projected position, with the free end of the lever 22 for manipulation be moved outwardly from the primary box more than a certain distance, hooks 7 are still in the releasing position, a PC 2 may be mounted on the table 3 without any disturbance, and pushed backward on the table 3 to be connected with the primary box 1 by the connector 5.

But, in the case of connecting the PC 2 in the wrong way such that a PC 2 is tried to be connected with the primary box 1 without putting it on the table 3, or tried to be mounted over the connector half 5a, for example, will be prevented by the pushers 25 projected forward of the half 5a.

Two pushers 25 will be pushed from the thrusting position to the waiting position by the PC 2 being backward on the table 3. At this time, as the pushers 25 are synchronized by the shaft 26 and the crank arms 27 mechanically, PC 2 will be prevented from oblique motion. As a result, the other half 5b of the connector 5 installed on the back board of the PC 2 will be appropriately connected with the half 5a, from the front side, installed on the vertical wall 4 to the latter one.

When the pushers 25 are pushed from the projecting position to the waiting position, the lever 22 for manipulation is pulled by sliding beam 29 to approach with the primary box 1, and is received by the first sliding plate 11, as shown in FIG. 1. But, as the plate 11 still remains in the front end position, the hook 7 remains at the releasing position, as shown in FIGS. 1 and 2.

After the PC 2 is connected with the primary box 1 by the connector 5, the lever 22 for manipulation is moved further to the side of the box 1 and is pushed into position along the primary box 1, thereby the hooks 7 are located to the hooking position and are engaged with the rear edges of the holes 32 formed at the bottom face of the PC 2, as shown in FIG. 3.

In the course of unloading PC 2 from the primary box 1, the lever 22 is swung outwardly and first, the hooks 7 are moved from the hooking position to the releasing position, then, pushers 25 thrust the PC 2 forward from the loading position to the disconnecting position where the connector 5 is disconnected. After that, the PC 2 can be taken up from the table 3 freely.

As shown in FIGS. 1, 4 and 5, a sliding member 33 is supported by the front wall 8 of the primary box 1 slidably in a lateral direction between the restraining position shown in FIG. 5, and the sliding member 33 restrains the free end of the lever 22 along the primary box 1 at the restraining position and is released by moving to the left to the releasing position shown in FIG. 6. The member 33 is biased to the restraining position by a leaf spring 34.

The member 33 is pushed by the free end of the lever 22 from the restraining position to the releasing position when the free end of the lever 22 is pushed toward the primary box 1, and after the free end of the lever 22 overrides the sliding member 33, the member 33 is pushed from the releasing position to the restraining position by the leaf spring 34 to restrain the free end of the lever 22.

Figure 9:
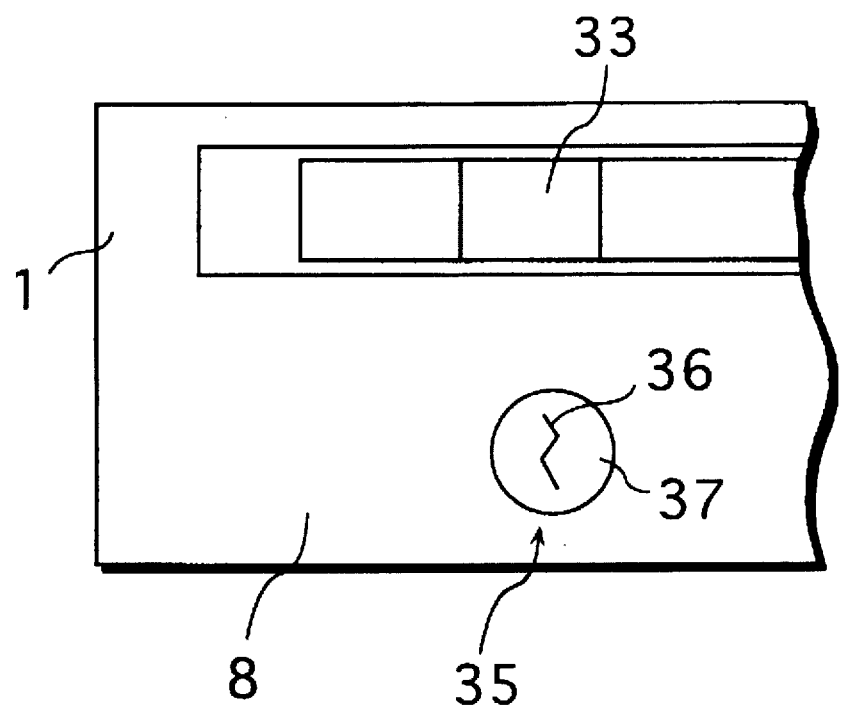
FIG. 9 is a front view of a means for locking up during operation, adapted to the embodiment according to the present invention.

On the front wall 8 of the primary box 1 under the member 33, as shown in FIG. 9, a lockup mechanism 35 is assembled.

Figure 10:
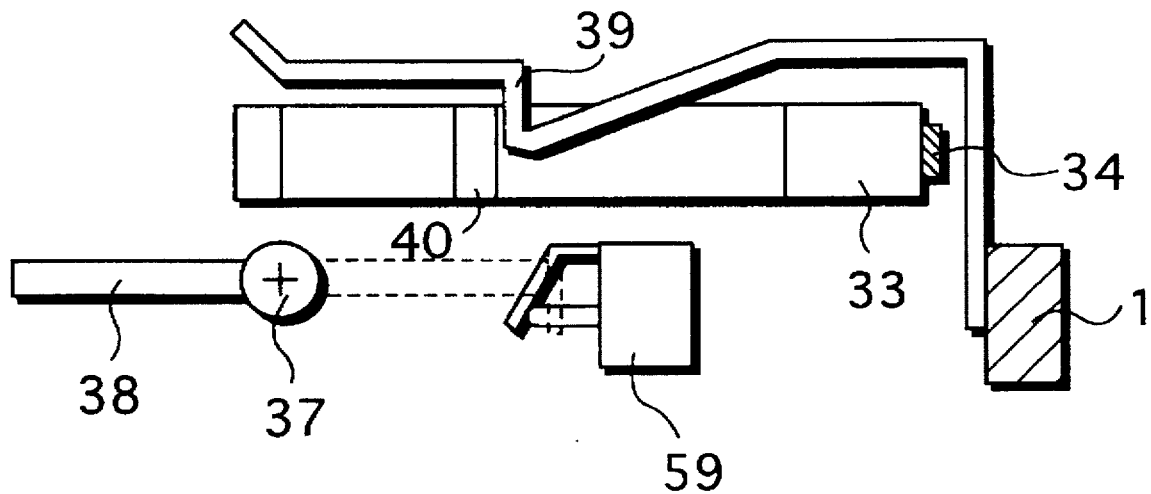
FIG. 10 is an illustration of the means for locking up on its work, adapted to the embodiment according to the present invention.
Figure 11:
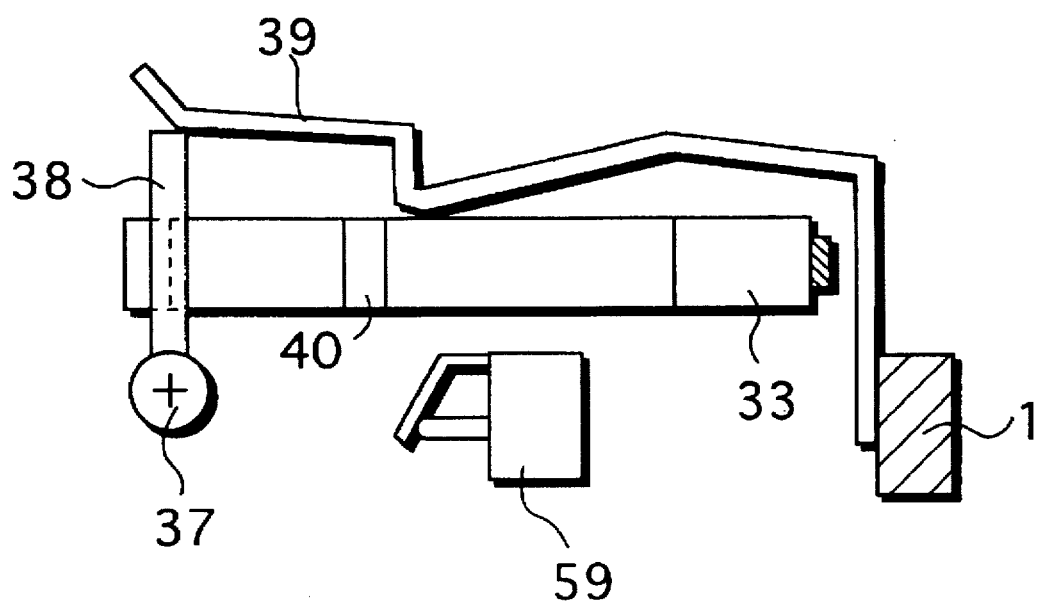
FIG. 11 is an illustration of the means for locking up off its work, adapted to the embodiment according to the present invention.

The lockup mechanism 35 is provided with a cylinder 37 which has a key hole 36 for inserting a particular key. An unlocking member 38 is connected to the cylinder 37 as shown in FIGS. 10 and 11. These are rotated by twisting the key inserted in the key hole 36 between an unlocking position shown in FIG. 10 and a locking position shown in FIG. 11.

Further, the lockup mechanism 35 is provided with a locking member 39 of a leaf spring supported at one end by the primary box 1. The locking member 39 permits the motion of the sliding member 33 from its releasing position to its restraining position by being pushed upward so that the projection 40 formed in the back of the sliding member 33 pushes it up, and stops the sliding member 33 at its restraining position by receiving the projection 40, as shown in FIG. 10. When the cylinder 37 and the unlocking member 38 are turned to the unlocking position, the locking member 39 is pushed up and releases the sliding member 33 by the unlocking member 38, as shown in FIG. 11.

By lock up of the sliding member 33 restraining the lever 22 in the restraining position, the lever 22 is impossible to operate, therefore, it is impossible that the hooks 7 can be disengaged from the PC 2 on the table 3. As a result, it becomes impossible to remove the PC 2 from the primary box 1 without permission.

The lockup mechanism 35 is further provided with a switch 59 which is turned on when the unlocking member 38 is located at the locking position and off when the unlocking member 38 is located at the unlocking position.

Figure 12:
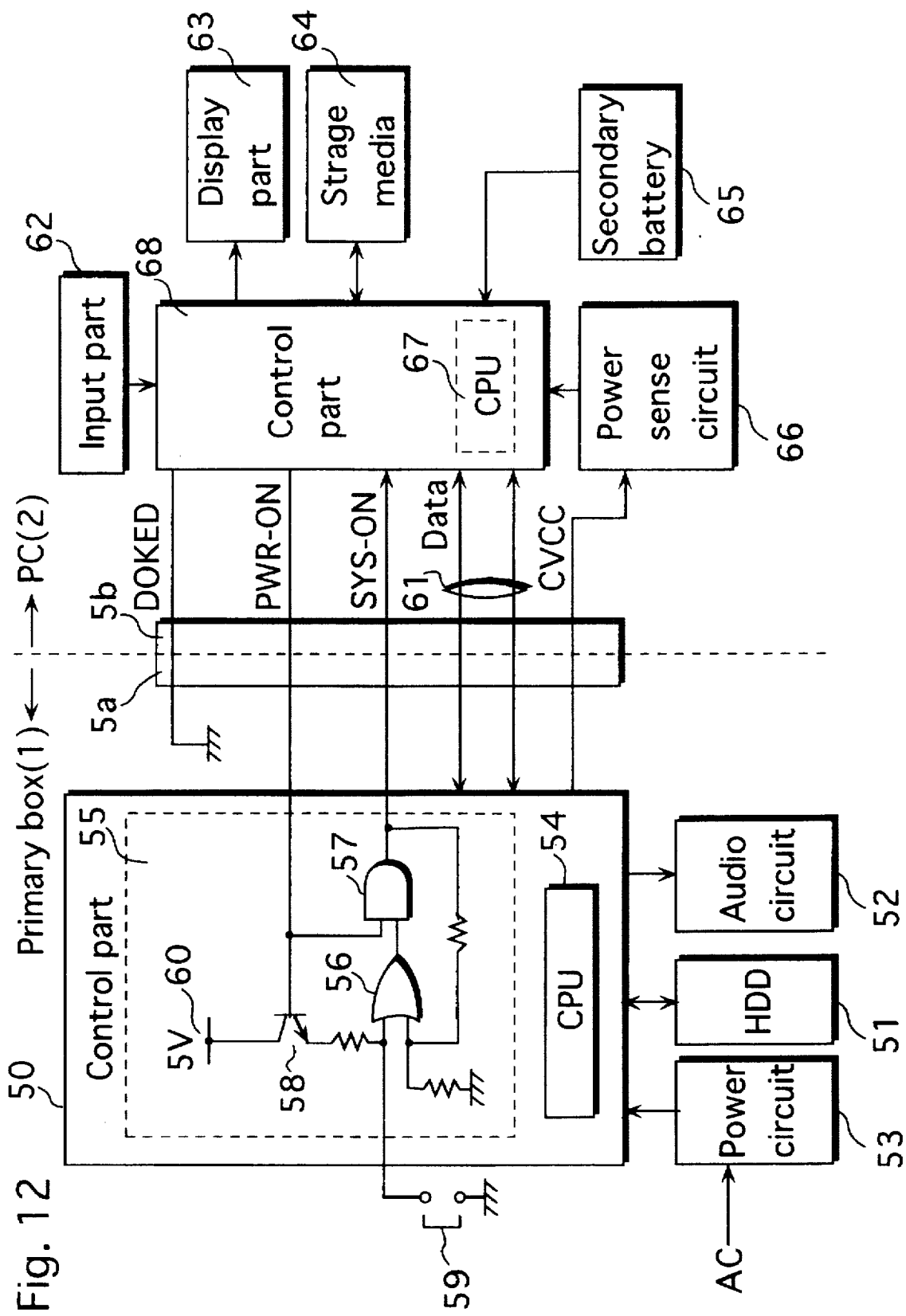
FIG. 12 is a block diagram of a means for security adapted to the preferred embodiment.

As shown in FIG. 12, the primary box 1 is provided with a control part 50, a hard data disk (HDD) 51, an audio circuit 52, and a power circuit 53 which receives powers from an AC power source and delivers it to the other parts as drive power after converting it to a proper voltage for each part. Further, the performances of the HDD 51 and the audio circuit 52 are controlled by the control part 50.

The control part 50 includes a central processing unit (CPU) 54 and a security circuit 55 which has an OR circuit 56 of dual input type, an AND circuit 57 of dual input type, and a switching transistor 58.

One input terminal of the OR circuit 56 is connected to ground by the switch 59 which is turned on when the lockup mechanism 35 is set in the locking position, and connected with output terminal 60 of a high level signal (5V) supplied from the power circuit 53 by the switching transistor 58.

The switching transistor 58 is turned on during the PWR-ON and a high level signal is supplied to its base from the PC 2, and transmits a high level signal from the output terminal 60 to one input terminal of the OR circuit 56.

The AND circuit 57 is gated open by the output of the OR circuit 56 and the PWR-ON supplied by the PC 2, to output the SYS-ON signal through the connector 5. The SYS-ON signal is delivered to the other input terminal of the OR circuit 56, so that the supply of the SYS-ON is kept on once it is outputted.

However, when the switch 59 is turned on, meaning that the lockup mechanism 35 is operative, the high level signal is not supplied to the one input terminal of the OR circuit 56 from the output 60, therefore, the SYS-ON will not be outputted from the AND circuit 57.

The PC 2 has a input part 62 of a key board, a display part 63 of a liquid crystal display, a storage media 64 of a hard data disk (HDD) or floppy data disk (FDD), a second battery 65 to deliver drive power for other parts in the PC 2, a power sense circuit 66 to be inputted CVCC by the connector 5, and a control part 68 which includes a central processing unit (CPU) 67 and semiconductor memory not shown, the controls the other parts in PC 2.

When the power switch, not shown, is turned on for requirement of booting, the control part 68 decides whether the PC 2 is loaded to the primary box 1 or not by way of detecting which the DOKED signal line is connected to ground by the connector 5 or opened.

When the decision is no, the control part 68 makes the other part unable to boot using the power of the secondary battery 65.

When the decision is yes, the control part 68 outputs PWR-ON, and after this, it boots the other part only when the SYS-ON of a high level signal is sent back. In this case, the PC 2 detects the CVCC from the primary box 1 by the power sense circuit 66 and uses it as drive power instead of the output of the secondary battery 65.

In case that the lockup mechanism 35 is operative, the SYS-ON will not send back a signal from the primary box 1, and the PC 2 will not be used without admission, even when the PWR-ON was supplied from PC 2.

And, once the SYS-ON is outputted, as the security circuit 55 senses the supply of the SYS-ON, the PC 2 will not power down in the course of booting, even when the lockup mechanism 35 is unlocked after this.

The numeral 61 in FIG. 12 designates a data bus.

Figure 13:
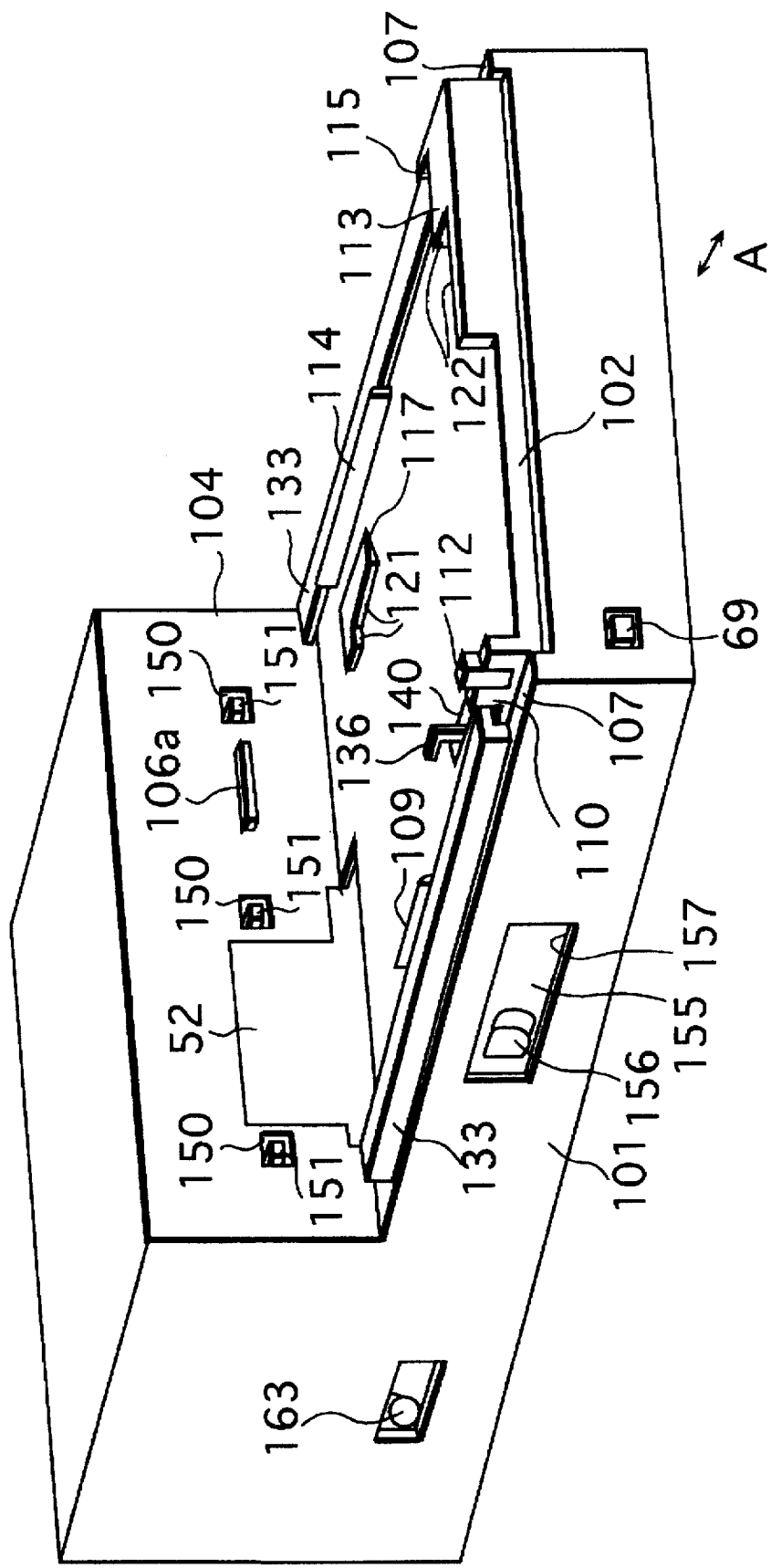
FIG. 13 is a perspective view of a further embodiment of the present invention shown when the table is located at its loading position.
Figure 14:
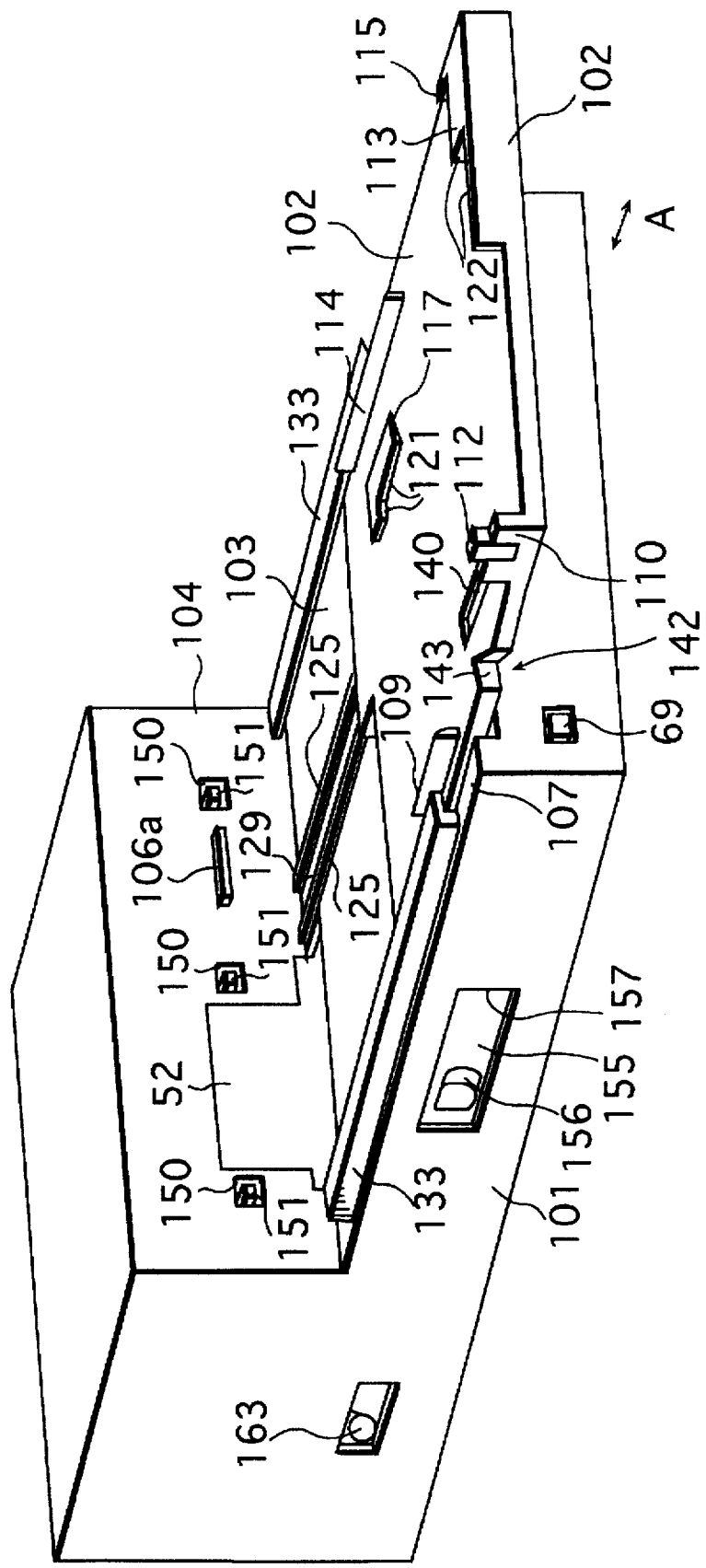
FIG. 14 is a perspective view of the further embodiment when the table is located at its foremost position.

Another preferred embodiment for the present invention, as shown in FIGS. 13 and 14, has a primary box 101 and a table 102 supported slidably in the longitudinal direction by the primary box 101.

Figure 15:
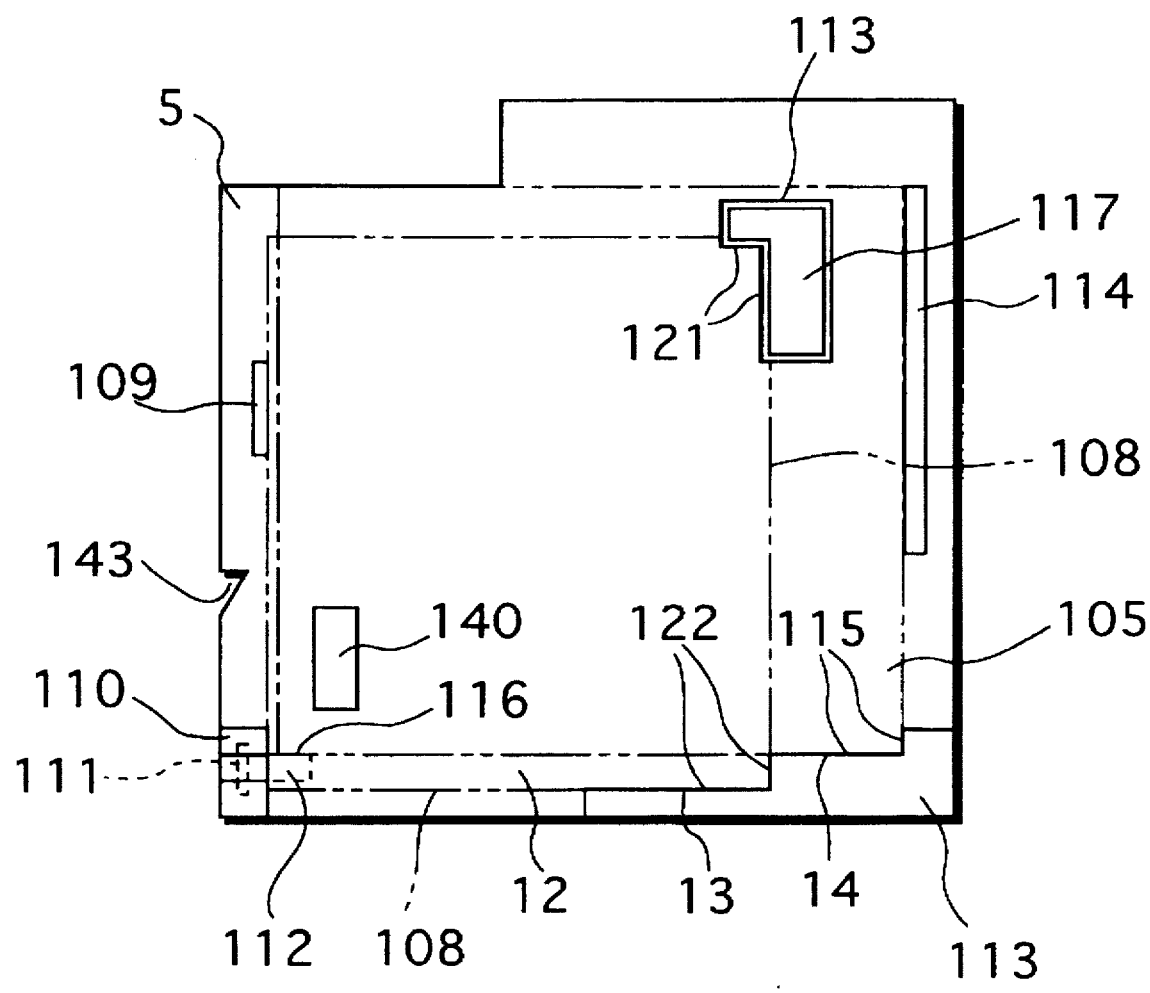
FIG. 15 is a plan view of the table adapted to the further embodiment of FIG. 13.

The primary box 101 is provided with a plain face 103 located under the table 102 and opposed to it, a vertical wall 104 upstanding from the rear end of the face 103 at the rear part of the table 102, and a half 106a of a connector 106 for a PC 105 of A4-notebook type as shown in FIG. 15.

The face 103 is provided with a pair of steps 107 at its bilateral ends, and the table 102 is mounted on the face 103 between these steps 107 to be guided its longitudinal motion.

As shown in FIG. 15, a PC 105 of A4-notebook type, or a PC 108 of sub-notebook type smaller than the former, may be selectively mounted on this table 102 in their respective predetermined position.

The areas for mounting each PC 105,108 can be located not to be overlapped on the table 102, but, in this embodiment, in order to reduce the size of table 102 and the box as a whole, the area for a small PC 108 of sub-notebook type is almost overlapped by the area for a large PC 105 of A4-notebook type.

And, in order to decide the location of the a PC 105 of A4-notebook type on the table 103, the table 103 is provided with a left rear common stopper 109 projecting like a rib elongated longitudinally at the left rear part, a left front common stopper 110 upstanding at the left front part, a tilting stopper 112 supported on the left front common stopper 110 about a longitudinal shaft 111 between an erect position and a level position laid on the table 102, a right front common stopper 113 projected at its front end from its center to its left end, and a right rear stopper 114 projected near its right end, elongated backward from its center.

A PC 105 of A4-notebook type is restrained longitudinally and laterally by mating its right front corner with a hook nosed stop face 115 formed at the back of the right front common stopper 113, its left front corner with another hook nosed stop face 116 formed along the left front common stopper 110 and the tilting stopper 112 horizontally located, its left rear part with the left rear common stopper 109, and its right rear part with the right rear stopper 114.

And, in order to restrain a PC 108 of sub-notebook type on the table 102, the table 102 is provided with an elevating stopper 117 located at the right rear part in the area for a PC 105 of A4-notebook type, in addition to the left rear common stopper 109 to determine the location of the PC 105 of A4-notebook type, the left front common stopper 110, and the right front common stopper 113.

Figure 16:
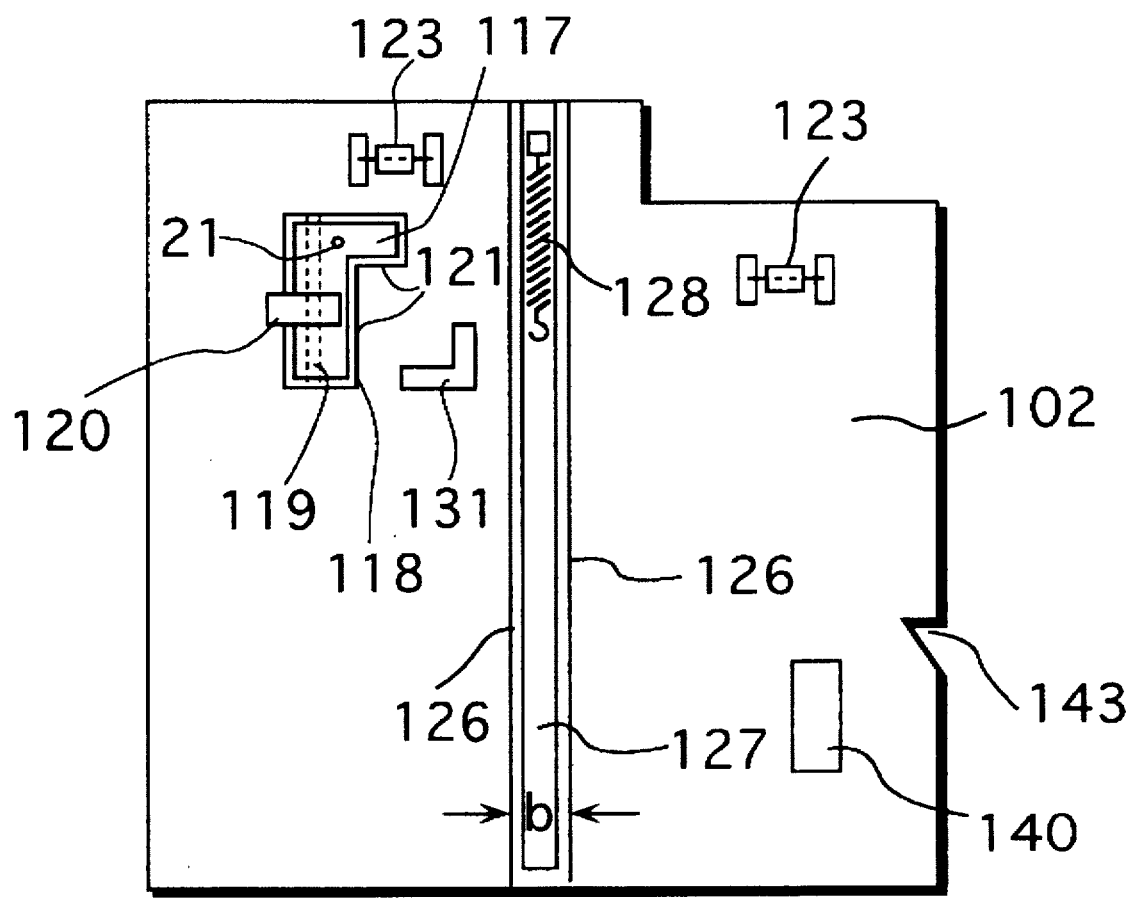
FIG. 16 is a bottom view of the table adapted to the further embodiment.

As shown in FIG. 16, the elevating stopper 117 is located in an L-shaped aperture 118 opened through the table 102, pivoted on the table 102 by a pin 119 penetrating the right end part of the elevating stopper 117 longitudinally. And, the elevating stopper 117 is biased by a leaf spring 120 supported at the bottom of the table 102 to project its left side over the top of the table 102, as shown in FIGS. 13 or 14.

As shown in FIG. 15, a PC 108 of sub-notebook type is restrained on the table 102 longitudinally and laterally by mating its right rear corner with a hook nosed stop face 121 formed in the left side of the elevating stopper 117, its right front corner with another L-shaped stop face 122 formed at the back of the right front common stopper 113, and its left part with the left rear common stopper 109 and left front common stopper 110.

Figure 17:
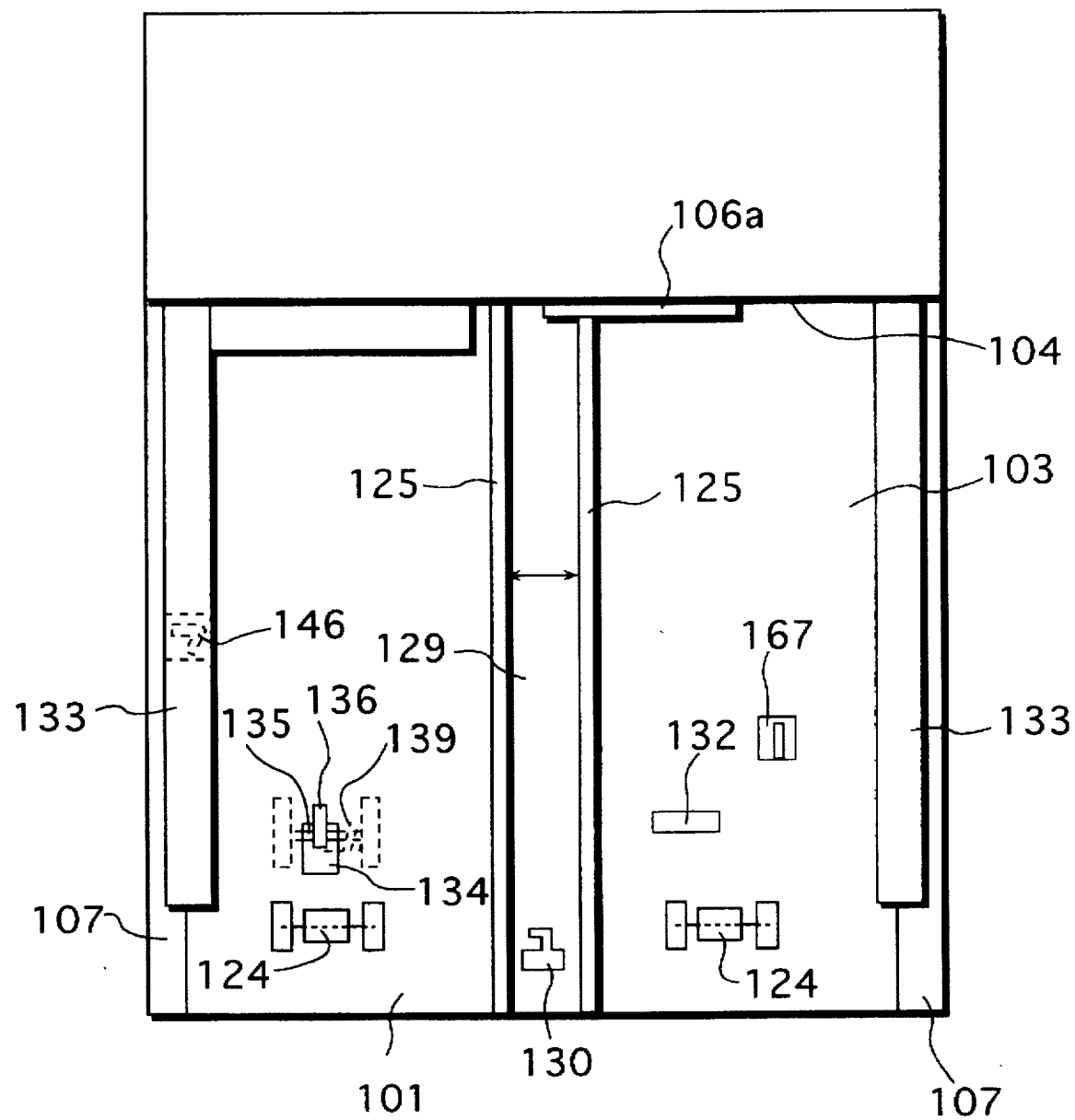
FIG. 17 is a plan view of a primary box adapted to the further embodiment.

Referring to FIGS. 16 and 17, the table 102 is provided with a pair of rollers 123 under it to make the longitudinal motion of the table 102 smooth. The rollers 123 are located near the rear end of the table 102 at a preferable lateral spacing, and pivoted under the table 102 to roll on the face 103 of the primary box 101 about their lateral axes. And another pair of rollers 124 are rotatably mounted on the face 103 near the front end of the face 103 at a proper lateral spacing, to roll under the table 103 about their lateral axes.

In order to prevent oblique motion of the table 102, the face 103 of the primary box 101 is provided with a pair of guide ridges 125 extending from the front end to the rear end of the face 103 at a proper lateral spacing. And the table 102 is also provided with a pair of guide ridges 126 elongated longitudinally from the front end to the rear end of the table 102 at a proper lateral spacing. The space "b" between the outer edges of guide ridges 126 under the table 102 is made a little narrower than the space "a" between the inside edges of guide ridges 125 on the face 103C so that the former is inserted between the latter slidably.

Near the rear end of the table 102, for example in a groove 127 between the guide ridges 126, one end of traction spring 128 is hooked. The other end of the spring 128 is hooked on the hooker 130 located neat the front end of the face 103 in a groove 129 between guide ridges 125 of the primary box 1. Thus, the table 102 is always biased forward by the spring 128.

In order to prevent the table 102 from being drawn off when moved forward, the table 102 is provided with a projection 131 near the rear end of its bottom, and a stopper 132 which receives the projection 131 from its front side back to just the predetermined distance from the front end of the face 103.

Further, in order to prevent the lifting up of the table 102 from the primary box 101, a pair of caves 133 hanging over the lateral ends of the table 102 is connected to the steps 107.

Figure 18:
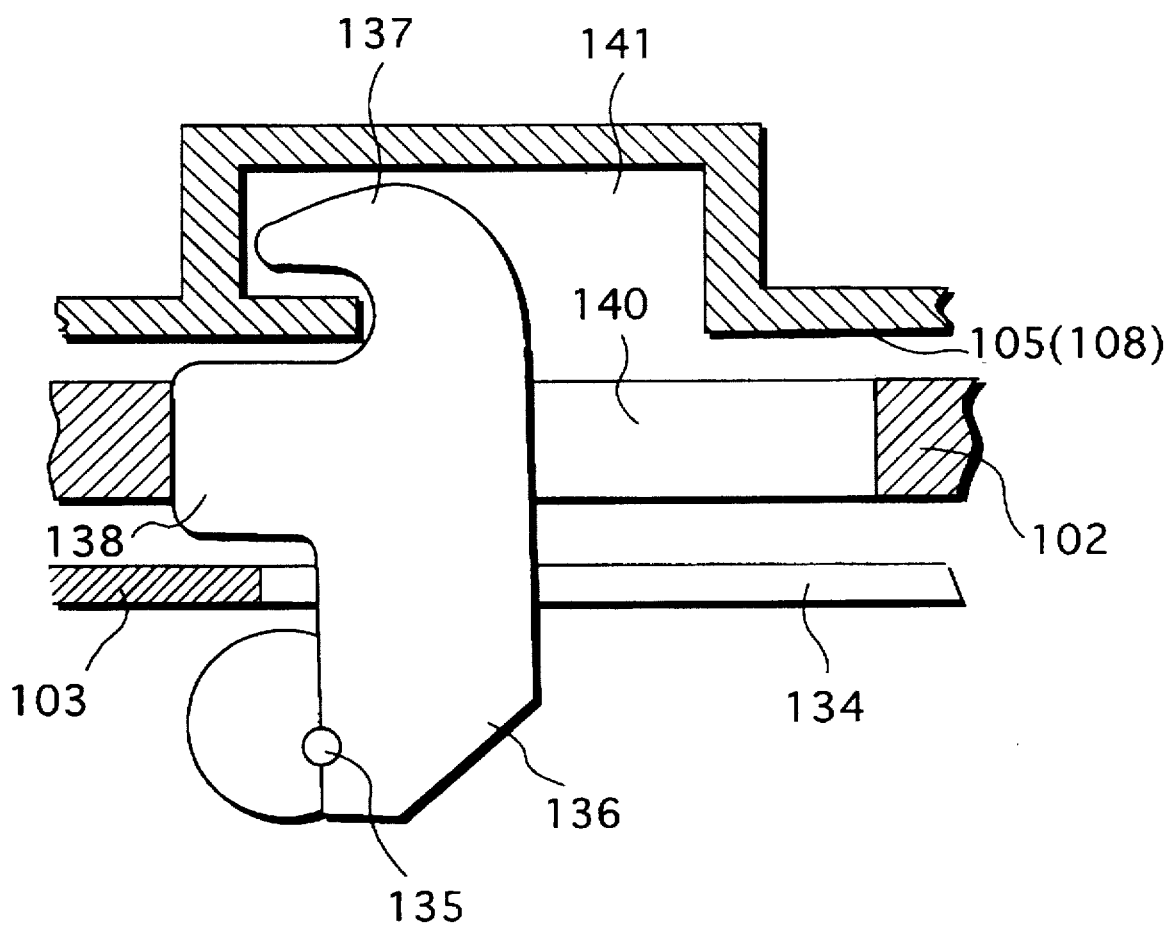
FIG. 18 is a side view of a hook in its hooking position, adapted to the further embodiment.
Figure 19:
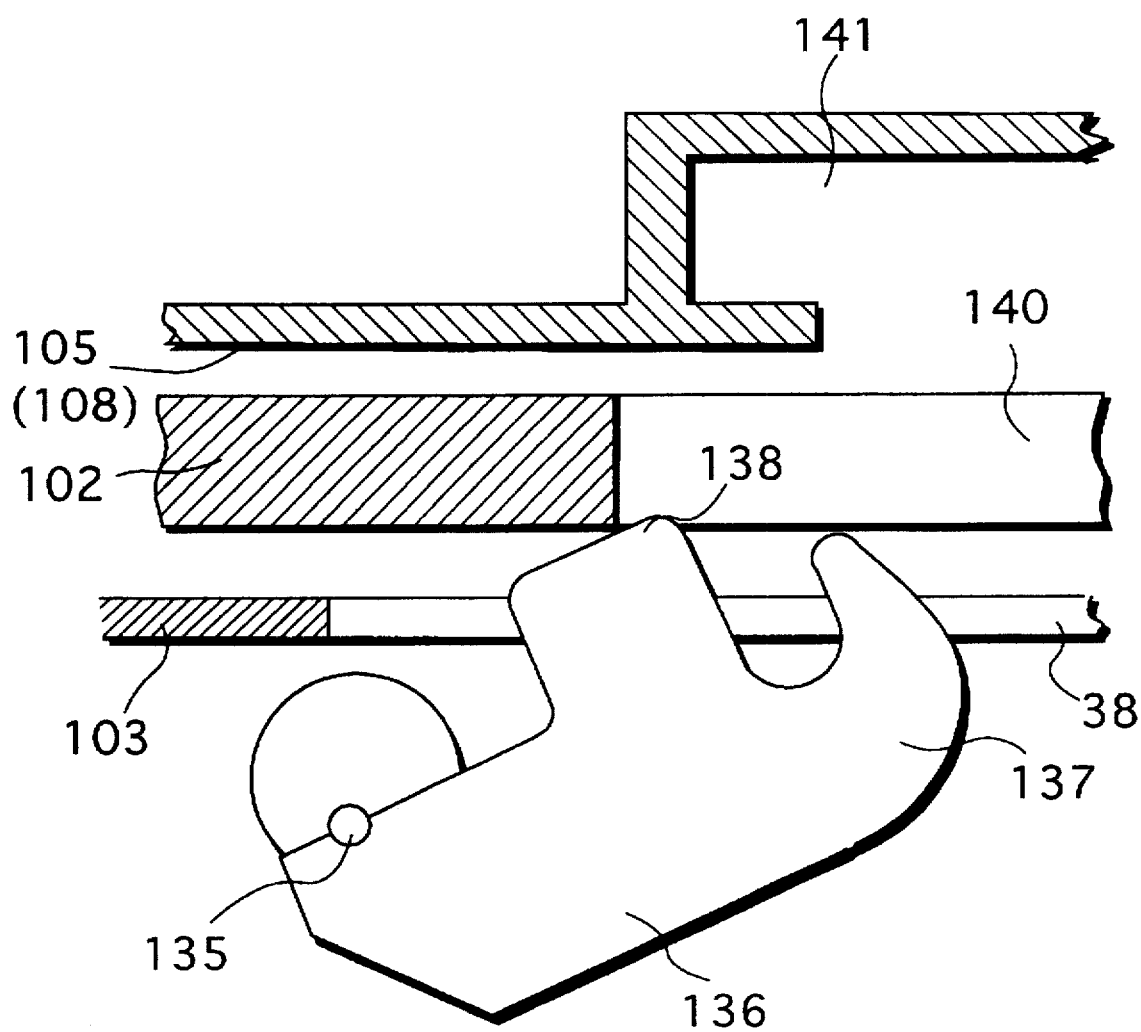
FIG. 19 is a side view of a hook in its releasing position, adapted to the further embodiment.

As shown in FIG. 17, an opening 134 is formed through the face 103 of the table 101 at its left from part, and a hook 136 is pivoted by a pin 135 located under the face 103 rotatably about a lateral axis to move between a hooking position, shown in FIG. 18, and a releasing position, shown in FIG. 19, through the aperture 134.

The hook 136 has a nose 137 elongated backward and a touching portion 138 projected backward further than the nose 137. The hook is biased toward its hooking position by a torsion spring 139 that is coiled around the pin 135 having one end connected to the hook 136 and the other to the primary box 101.

Through the table 102, an opening 140 is formed at the position over the hook 136 so that when the PC 105(108) of the table 102 is located in the loading position where the PC 105(108) is connected by the connector 106, to admit the motion of the hook 136 through it between the hooking position where the nose 137 is projected over the table 102 and a releasing position where the nose 137 is depressed lower than the table.

Moreover, a hook nosed hole 141, see FIG. 18, whose nose is bent backward, is formed in the bottom board of the PC 105(108) mounted on the table 102, for vertical restraint of the PC 105(108) by inserting the hook 136 nose 137 into the hole 141.

When the table 102 is moved forward from the loading position, the stop 138 of the hook 136 is pushed down to the front by the rear edge of the aperture 140, the hook 136 is pushed down, and the stop 138 is depressed under the table 102, then the hook 136 is placed there.

When the table 102 is in the foremost position where the projection 131 is stopped by the stopper 132, since the hook 136 is located under the table 102, a user can mount a PC 105(108) in its position on the table 102 freely, and may connect the PC 105(108) with the primary box 101 by the connector 106 by moving it back with the table 102.

While loading of the PC 105(108), the hook 136 starts to rotate and reaches the hooking position when the table 102 had reached the loading position.

In order to prevent the PC 105(108) from accidental disconnection after it has connected with the primary box 101 by the connector 106, a stopping means 142 is assembled between the table 102 and the primary box 101.

Figure 20:
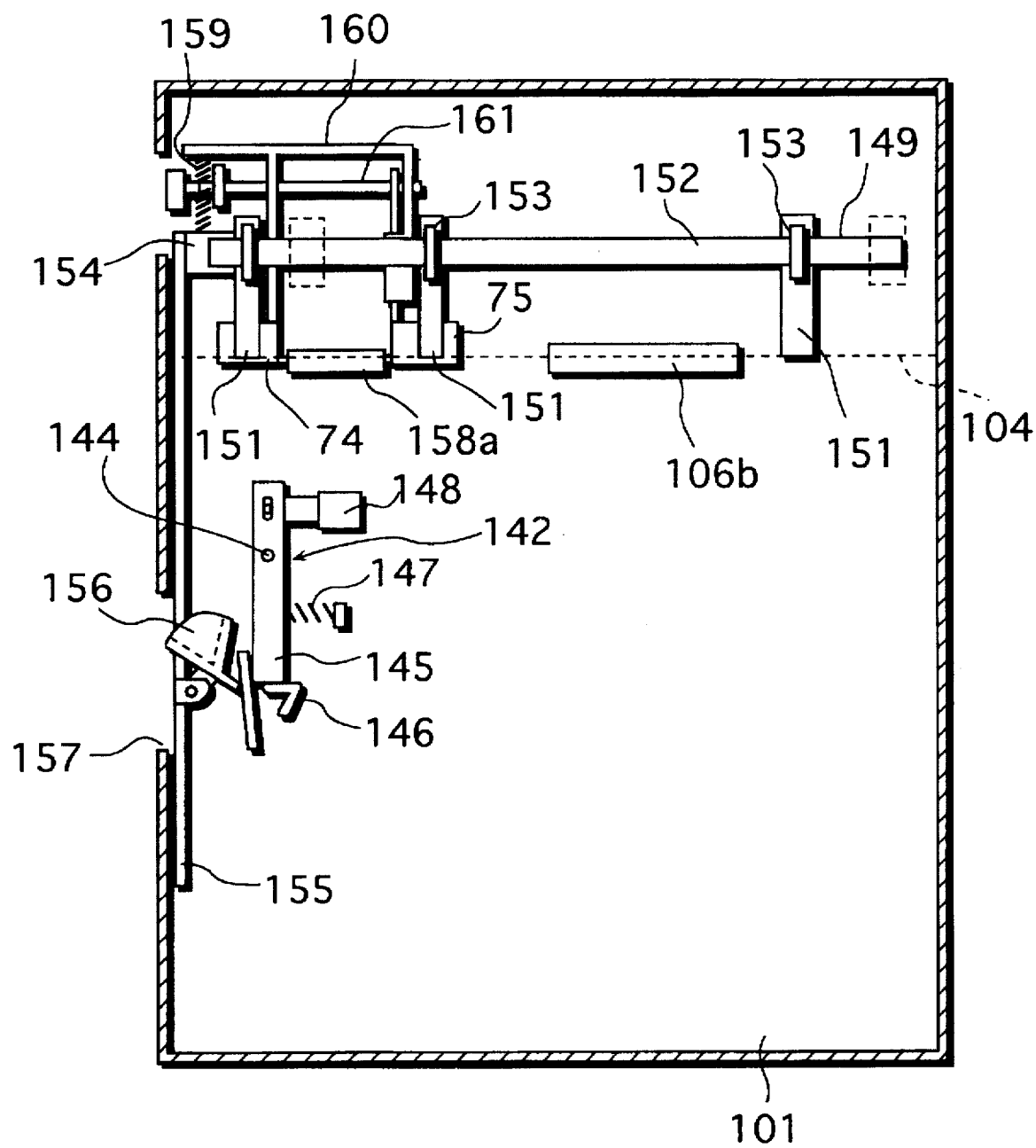
FIG. 20 is a plan view of a thrusting mechanism, a retracting mechanism and a stopping means adapted to the further embodiment.

The stopping means 142 has a notch 143, as shown in FIGS. 15 and 16, formed in the middle of left side of the table 102, a lever 145, as shown in FIG. 20, pivoted on the primary box by a pin 144 rotatably about a vertical axis, a stopper 146 fixed to free end of the lever 145, being moved from and to the notch 143, a traction spring 147 biasing the lever 145 to the direction that the stopper 146 is moved to the notch 143, and a solenoid 148 connected with the other free end of the lever 145, which drives to the direction which stopper 146 departs from the notch 143.

The stopper 146 is pressed on and slid along the face of the table 102, when the table is moved forward from the loading position. And the stopper 146 is moved into the notch 143 by the traction spring 147 and stops the table 102 when the table 102 has reached the loading position.

To move the table 102 forward from the loading position, the solenoid 148 is actuated to move the stopper 146 off the notch 143, so that the table 102 is ready to be move forward by the traction spring 128.

In this case, the PC 105 is movable toward the back from the table 102, it is impossible to disconnect the connector 106 by the traction provided by traction spring 128. Therefore, in this embodiment, the primary box is provided with a thrusting mechanism 149 which pushes the PC 105 forward from the loading position to the disconnecting position.

The thrusting mechanism 149 is provided with three primary pushers 151 inserted through the openings 150 which are formed through the vertical wall 104 of the primary box 101 at a proper lateral spacing, to be moved in the longitudinal direction between a waiting position where the front ends of the three pushers 151 are flush with the front face of vertical wall 104 and a projected position where the front end of the primary pushers 151 are projected forward from the front end of the connector half 106a as shown in FIG. 13.

As shown in FIG. 20, the mechanism 149 has a rotary shaft 152 supported by the primary box 101 behind the vertical wall 104 above the primary pushers 151 rotatably about a lateral axis, and three crank arms 153, 154 each of which connects a pusher 151 with the shaft 152.

The left crank arm 154 is connected to a sliding plate 155 located in left side in the primary box 101 slidably in the longitudinal direction, and at the mid part of the sliding plate 155, a manipulation piece 156 is pivoted rotatably about a vertical axis.

A traction spring 159 is hooked between the left crank arm 154 to bias the arm 154 backward, and the arm 154 biases the primary pushers 151 toward their waiting position.

Figure 21:
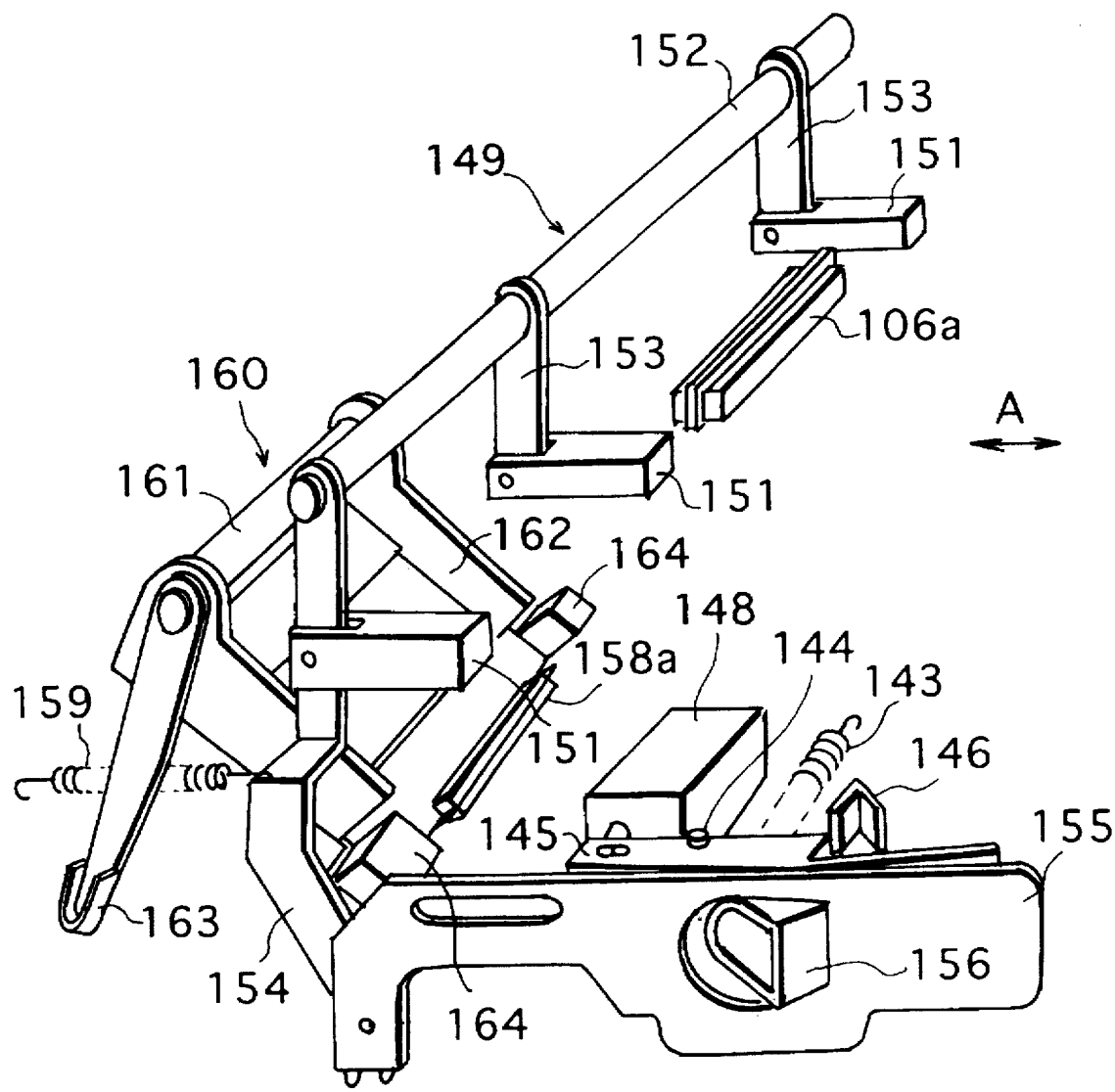
FIG. 21 is a perspective view of the thrusting mechanism, the retracting mechanism and the stopping means adapted to the further embodiment when a half of a sub-connector is located in its retracted position.
Figure 23:
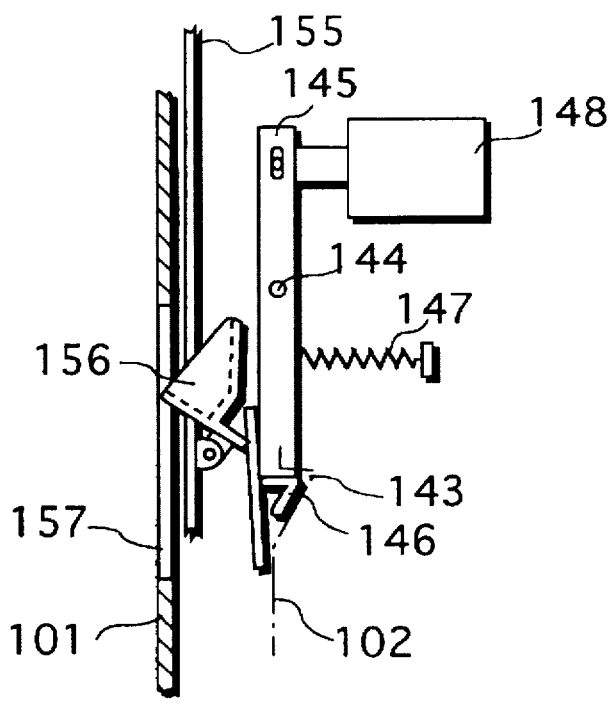
FIG. 23 is a plan view of the stopping means in its operating position adapted to the further embodiment.

As shown in FIGS. 21 and 23, the manipulation piece 156 is biased to turn in the primary box 101 by a torsion spring not shown, to restrain the stopper 146 in the notch 143 by receiving a free end of the lever 145 at its left side when the primary pushers 151 are in the waiting position.

Figure 24:
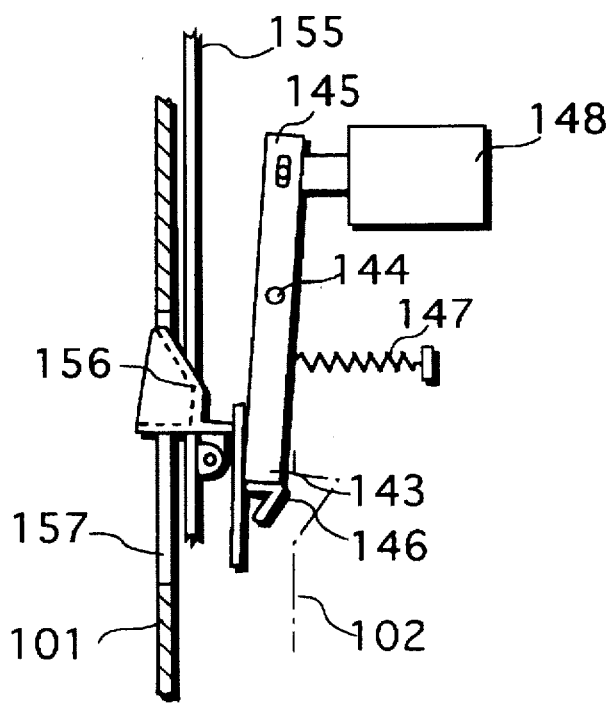
FIG. 24 is a plan view of the stopping means off its operating position, adapted to the further embodiment.
Figure 25:
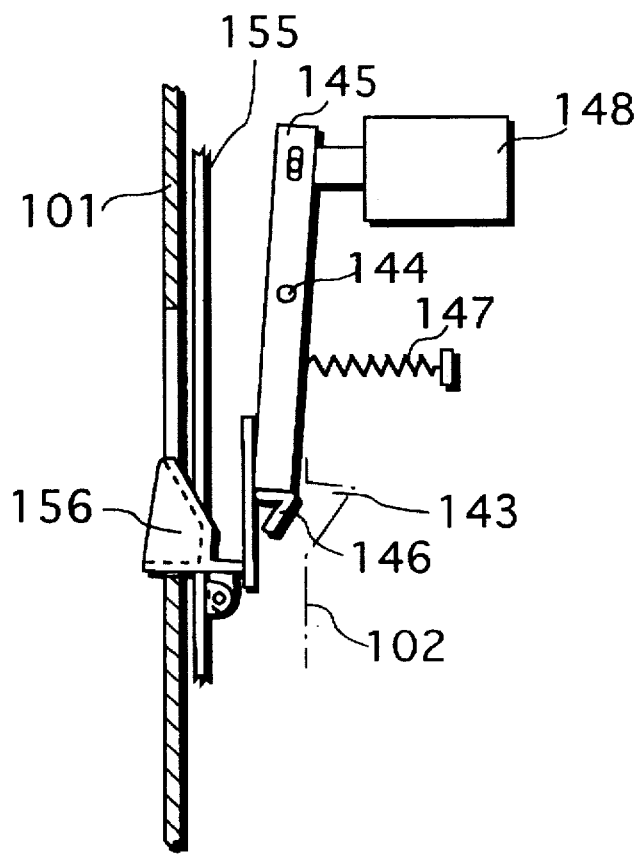
FIG. 25 is a plan view of the stopping means showing the operation of the thrusting mechanism, adapted to the further embodiment.
Figure 27:
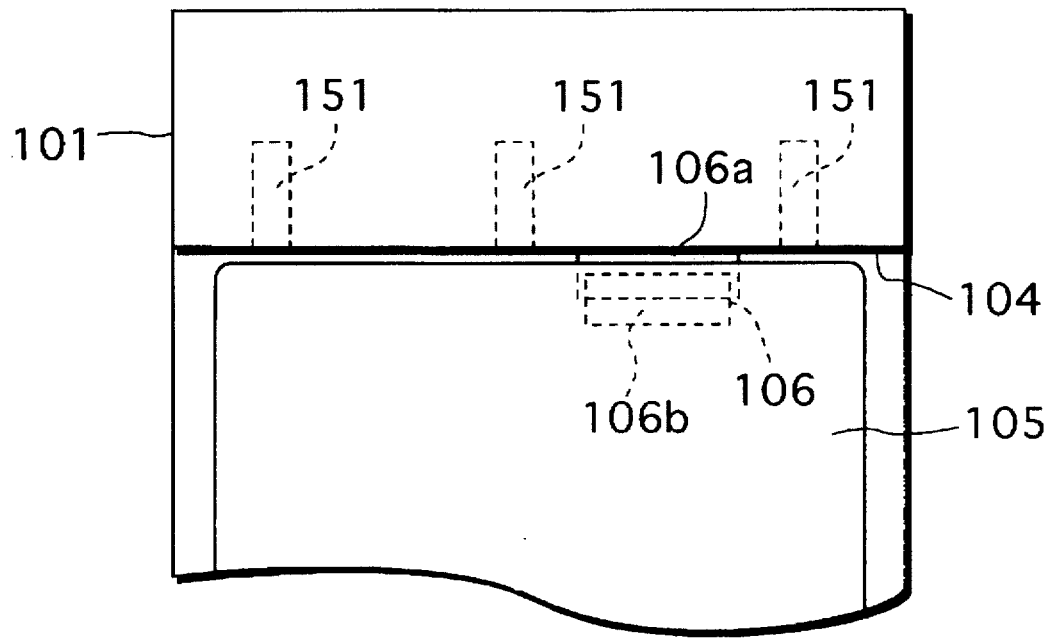
FIG. 27 is a plan view of the embodiment when a large equipment loaded, showing the locations of pushers.

And when the manipulation piece 156 is operated to pull backward, the position where the piece 156 restrains the lever 145 is moved to left, and the stopper 146 will be moved out of the notch 143 when the solenoid 148 is in operation, as shown in FIG. 24, and thus the table 102 will become ready for its forward motion. At this moment, the primary pushers 151 are remaining in waiting position and the connector 106 is still connected, as shown in FIG. 27.

Figure 28:
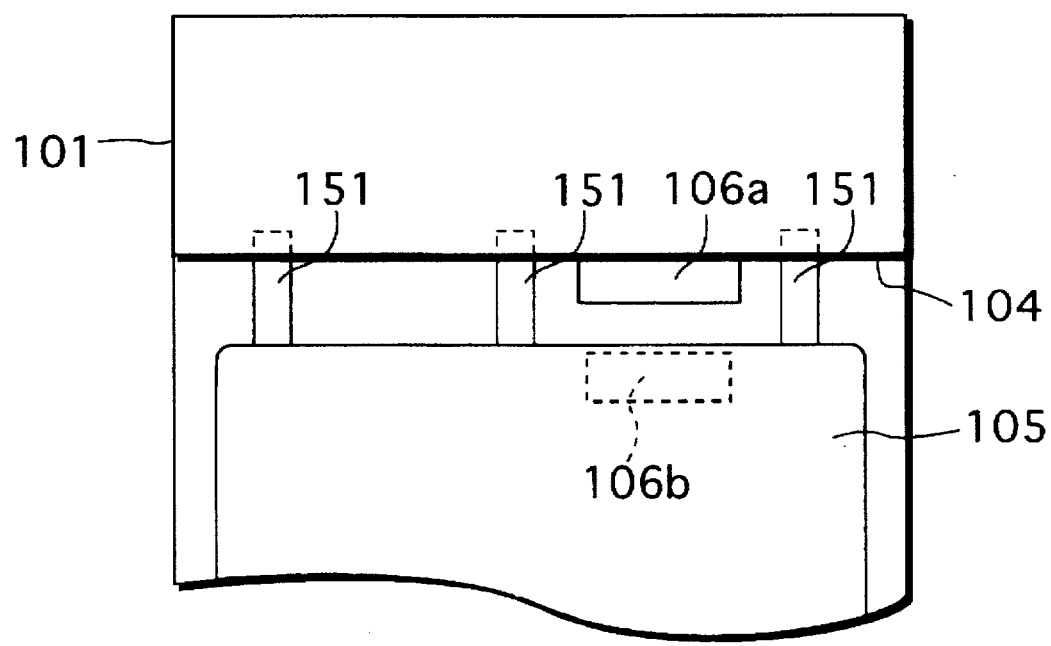
FIG. 28 is a plan view of the embodiment when a large equipment is disconnected on it, showing the locations of pushers.

When the manipulation piece 156 as moved forward, as shown in FIG. 24, each primary pusher 151 is pushed out to its projecting position by the crank arm 154, the shaft 152, and the crank arm 153, and the halves 106a, 106b of the connector 106 are disconnected, as shown in FIG. 28. And when the connector 106 is disconnected, the resistance against the forward movement of the table 102 is decreased suddenly, and the table 102 and the PC 105 will be moved to their foremost position by the traction of traction spring 128.

By the way, in this embodiment, in order to connect a PC 108 of sub-notebook type, the primary box 101 is provided with another half 158a of a different connector 158,as shown in FIG. 20. This half 158a is supported by a retraction mechanism 160 of the primary box 101 which moves rotationally between a utilizing position, where the half 158a is located above the table 102 in the left front of the half 106a installed on the vertical wall 104, and a retracted position, where the half 158a is retracted under the table 102 behind the vertical wall 104.

The retraction mechanism 160 is provided with a shaft 161 rotatable about a lateral axis, a pair of crank arms 162 fixed with the shaft 160 at one end, and supporting the retractable half 158a at the other end, and a lever 163 for manipulation.

Figure 22:
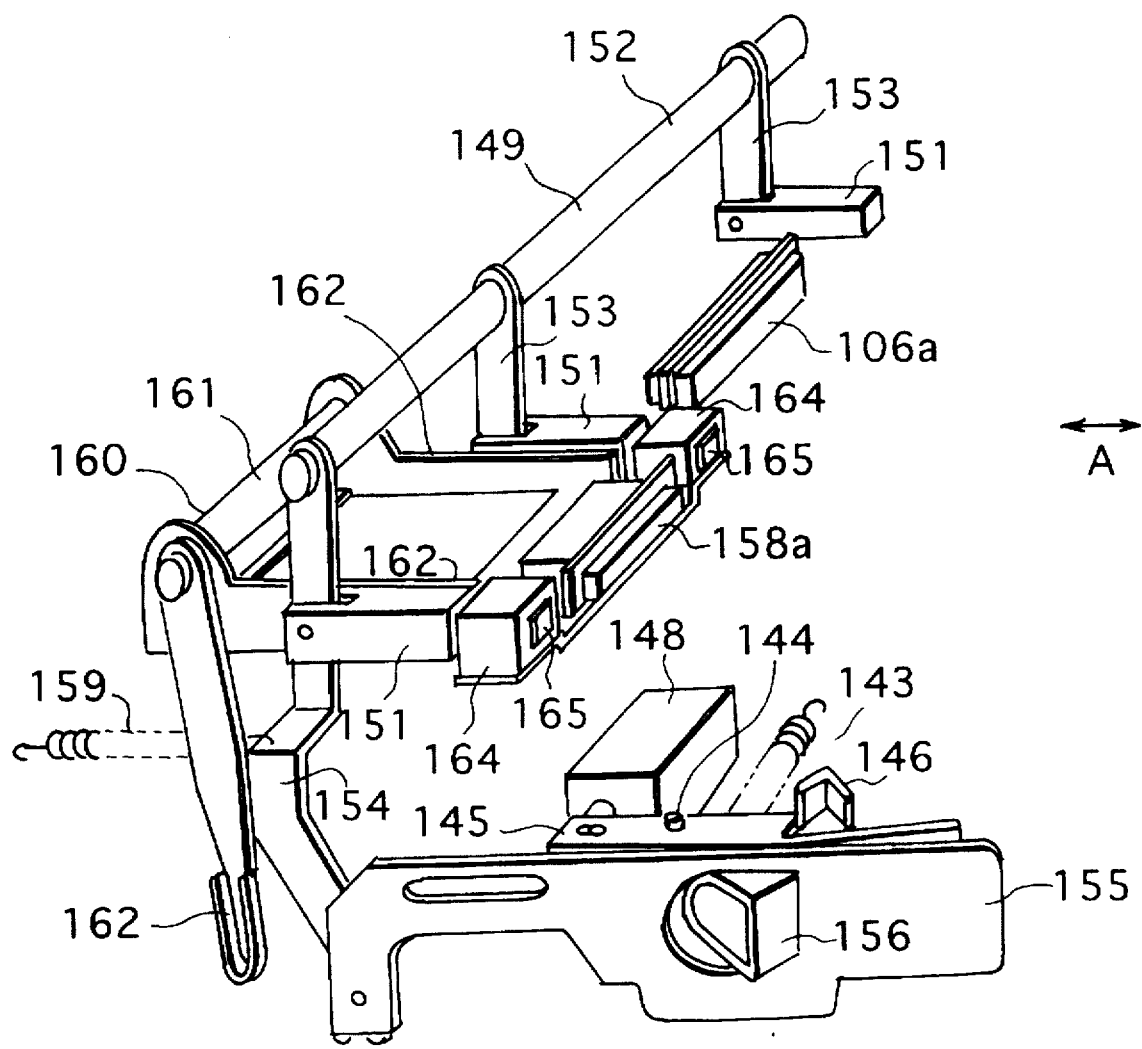
FIG. 22 is a perspective view of the thrusting mechanism, the retracting mechanism and the stopping means adapted to the further embodiment when the half of the sub-connector is located, in utilizing position.
Figure 29:
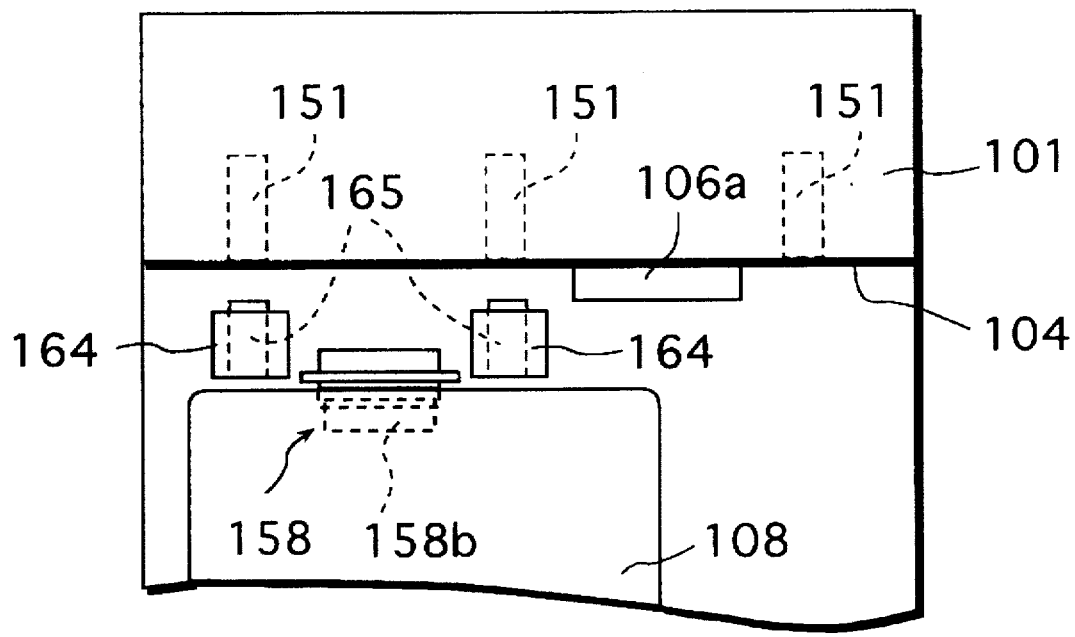
FIG. 29 is a plan view of the different embodiment when a small equipment is loaded, showing the locations of pushers and supplementary pushers.

When the PC 108 of sub-notebook type is selected to install, the retractable half 158a is raised up to the utilizing position as shown in FIGS. 22 and 29, and otherwise, it is retracted to the retracted position as shown in FIGS. 20 and 21.

Figure 30:
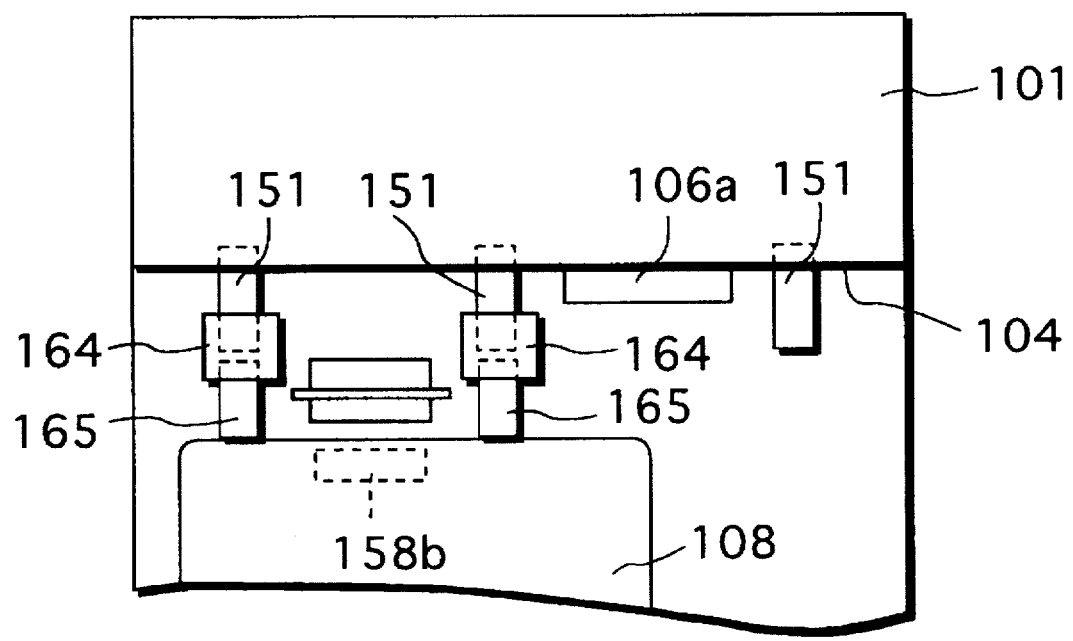
FIG. 30 is a plan view of the different embodiment when a small equipment is disconnected on it, showing the locations of pushers and supplementary pushers.

In the utilizing position, the retractable half 158a is opposed to the half 158b installed on the back of the PC 108 on the table in its position, as shown in FIGS. 29, and 30.

The thrusting mechanism 149 according to this embodiment is to push out the PC 108 of sub-notebook type forward from the loading position where it is connected with the primary box 101 by the connector 158 to the disconnecting position where the connector is disconnected.

To accomplish this, the thrusting mechanism 149 has a pair of holders 164 supported by the crank arms 162 of the retraction mechanism 160 at bilateral sides of the half 158a, to be moved between the waiting position and the utilizing position together with the half 158a.

As shown in FIGS. 22 and 29, these holders 164 are located in from of the two left primary pushers 151 and the supplementary pushers 165 are held by them slidably in the longitudinal direction between the waiting position where the front ends of the supplementary pushers 165 are abreast with those of holders 164 to the projecting position where the front ends of the supplementary pushers 165 are projected forward of the front end of the half 158a.

Figure 26:
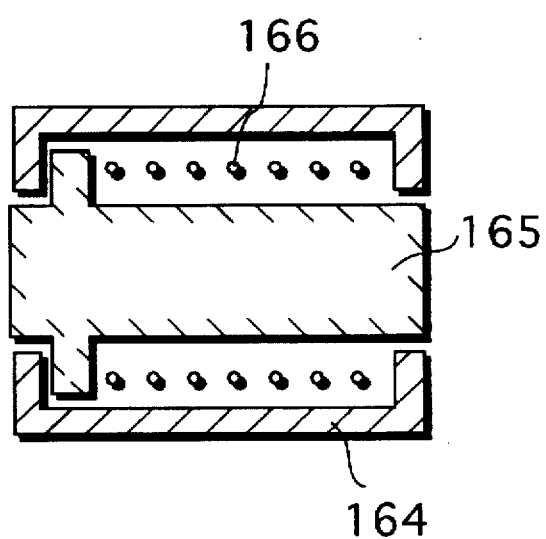
FIG. 26 is a fragmentary sectional view of the main part of the support pusher adapted to a different embodiment according to the present invention.

As shown in FIG. 26, each holder 164 is formed in a square cylinder, containing a compression spring 166 which biases the supplementary pusher 165 to the waiting position.

When the thrusting mechanism 149 is manipulated to move primary pushers 151 from their waiting position to their projecting position, they push supplementary pushers 165 from the waiting position to the projecting position, as shown in FIG. 30, and PC 108 is pushed out of the loading position to the disconnecting position, resulting that the connector 158 is disconnected.

As shown in FIG. 17, the primary box 101 is provided with a micro switch 167 on the face 103 at the position under the elevating stopper 117 of the table 102 in its foremost position. The elevating stopper 117 is depressed lower than the upper face of the table 102 to turn the micro switch 167 on when a PC 105 of A4-notebook type is mounted on the table 102, and projects over the table 102 to turn the micro switch 167 off when a PC 108 of sub-notebook type is mounted. Thus, it is possible to distinguish the type of PC mounted on the table 102 by the ON or OFF action of this micro switch 167.

And, the primary box 101 is provided with another micro switch which detects the position of the retractable half 158a to detect the half located foremost over the table 102.

Further, the primary box 101 is provided with an information means which informs of the adaptability of the PC when the detected PC and the detected half are in correspondence with each other.

The information means may be by audible and/or visual information.

The type of PC is detected by the micro switch 167 at the moment when a PC is mounted on the table 102 located in the foremost position, then the adaptability of the PC with the half detected by another micro switch is detected, and if the adaptability is affirmed, the information means will work. By recognition of the information the user can push the table 102 with PC to the loading position without anxiety. If the information was not given, the user is urged to change the position of retractable half 158a by manipulating the retracting mechanism 160.

In this embodiment, when the stopping means 142 which had restrained a vacant table 102 in the loading position, is released, the table 102 will be moved forward forcibly by the traction spring 128. If the traction of the spring is too strong, the projection 131 may collide against the stopper 132 with a force such that the projection 131, the stopper 132, the face 103 of the primary box 101, or the table 102 is damaged.

Figure 31:
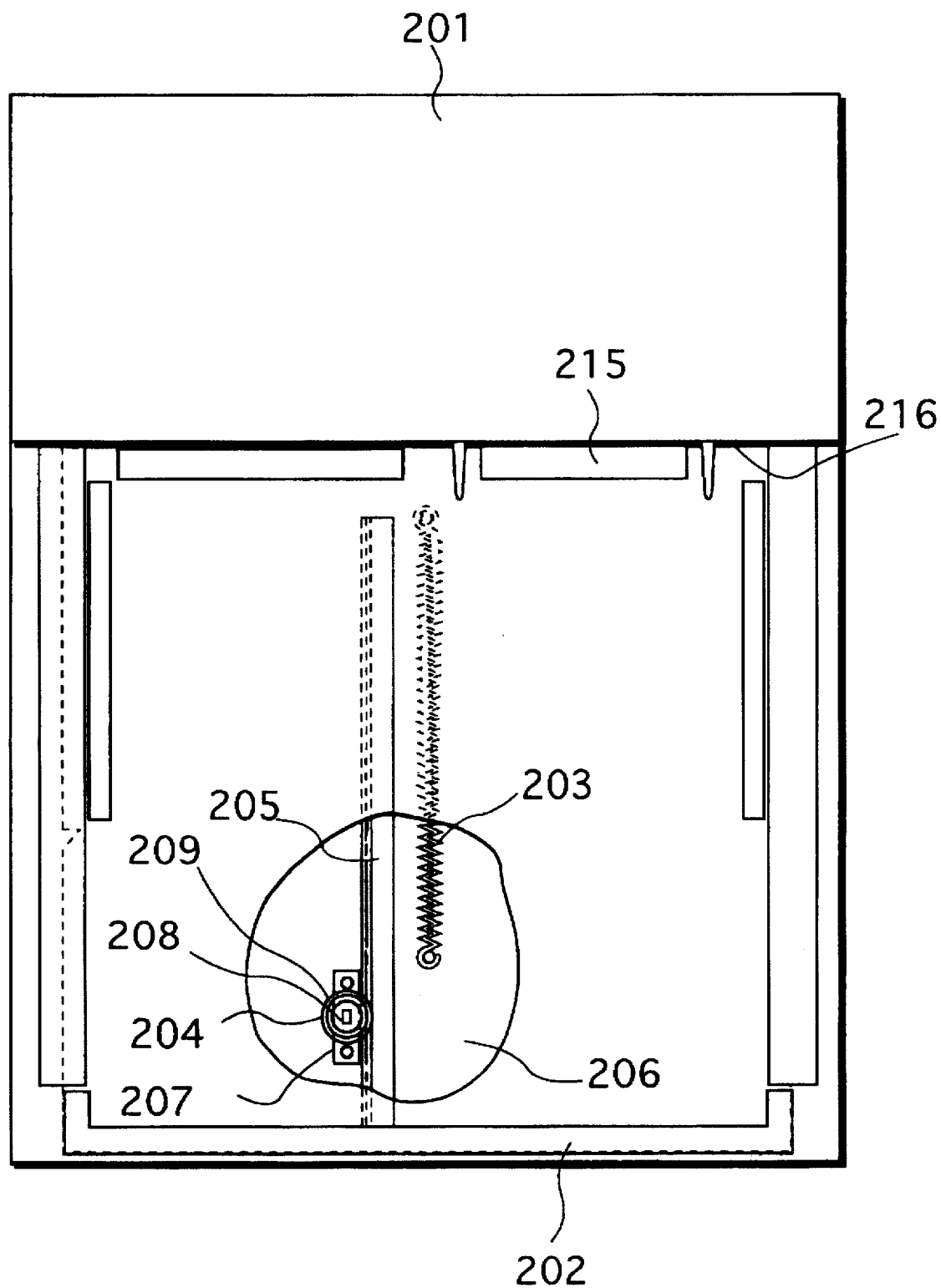
FIG. 31 is a plan view of a further different preferred embodiment of the present invention when the table is located at its loading position.
Figure 32:
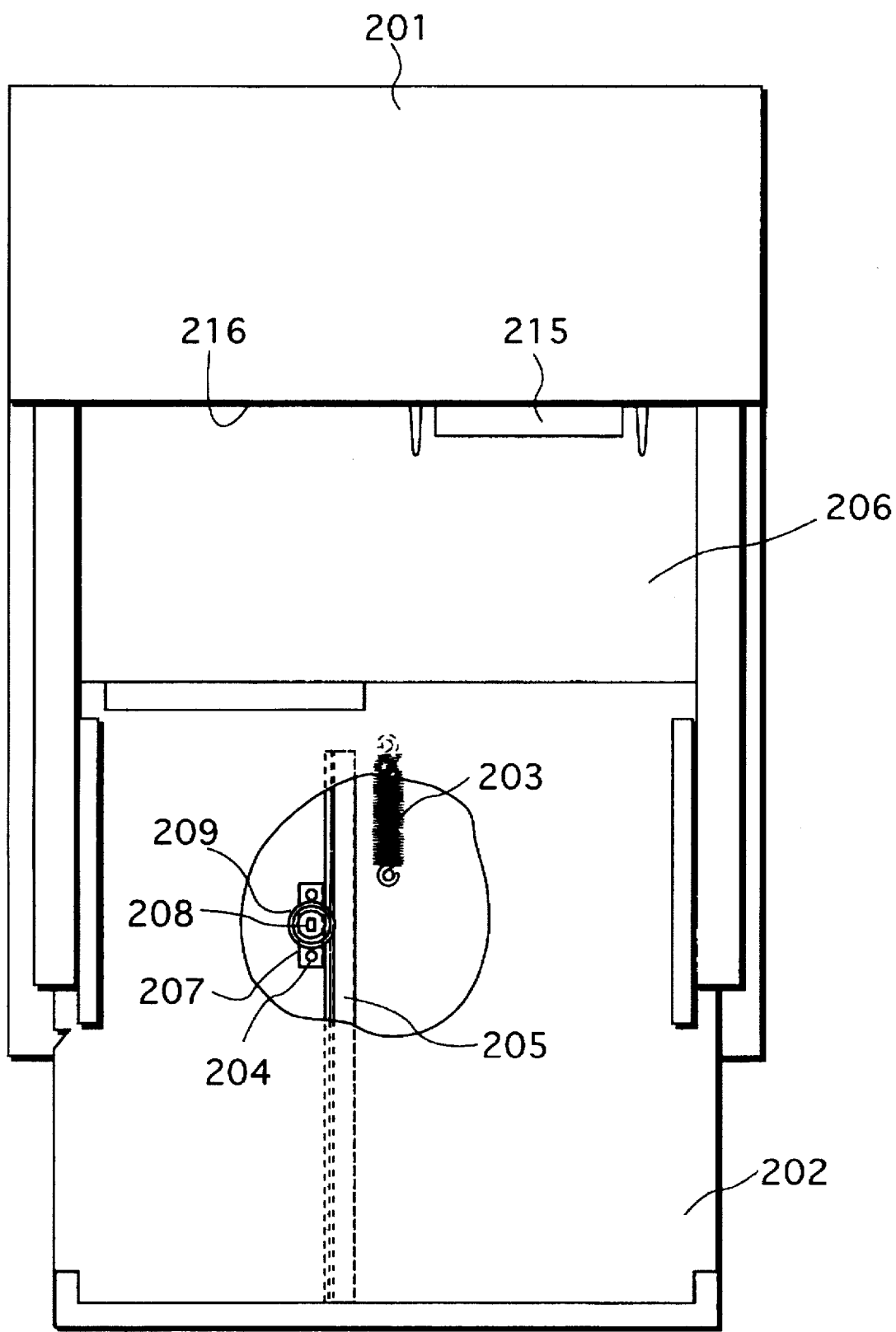
FIG. 32 is a plan view of the further different embodiment when the table is located at its foremost position.

In order to prevent this problem, as in another embodiment of this invention shown in FIGS. 31, 32, for example, it is preferable to use a damper system 204, which damps the tension of the traction spring 203 which biases the table 202 forward between the primary box 201 and the table 202.

The damper system 204 is provided with a longitudinal rack 205 fixed to the bottom of the table 202, a rotary damper 207 supported on the face 206 of the primary box 201, opposed to the bottom of the table 202, a damper gear 209 fixed to the rotary shaft 208 of the rotary damper 207 and engaged with the rack 205.

Figure 33:
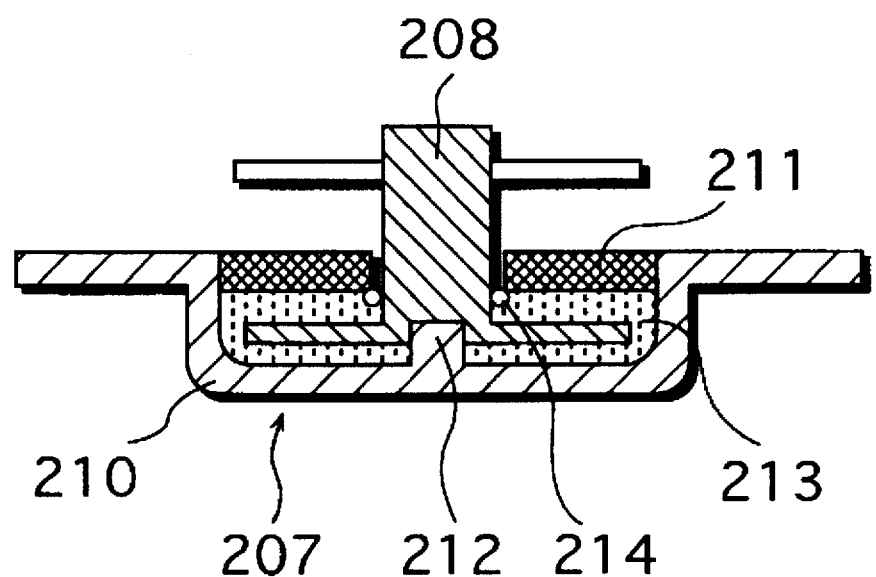
FIG. 33 is a sectional view of a rotary damper adapted to the further different embodiment.

As shown in FIG. 33, the rotary damper 207 has a case 210 formed like a pan and a lid 211 covering the open side of the case 210. A rotary shaft 208 extends through the lid 211 and is supported by a projection 212 projected from the bottom of the case 210 rotatably. The case 210 is filled with grease 213 to resist against rotation of the rotary shaft 208, and the rotary shaft 208 is enlarged radially like a disk in the case 210 in order to increase the resistance. Further, an O-ring 214 is inserted between the rotary shaft 208 and the lid 211.

Although the resistance against the rotation of the rotary shaft 208 is provided by the grease 213 in this embodiment, also a spring means or rubber may be used instead of the grease 213.

When the stopping means 215 stopping the vacant table 202 in its loading position is released, the table 202 is moved forward by the traction spring 203, the rack 205 is also moved forward with the table 202 and the damper gear 209 and the rotary shaft 208 are rotated. Then, the traction of the traction spring 203 is damped by the resistance of the grease 213 against the rotary shaft 208, and the forward motion of the table 202 also is damped.

As the result, the forcible collision of the projection formed on the lower face of the table 202 and the stopper formed on the primary box 201 is prevented and the projection and stopper, the table 202, and primary box 201 are prevented from damage.

When the primary box is provided with a damper system 204, it is preferable to remove resistance by the damper system 204 when the table 202 is pushed backward, and for the purpose, it is preferable that the rotary shaft 208 and damper gear 209 is intermediated by a one way clutch, for example.

According to FIGS. 31 and 32, numeral 215 designates a half of a connector, and 216 designates a vertical wall.

Figure 34:
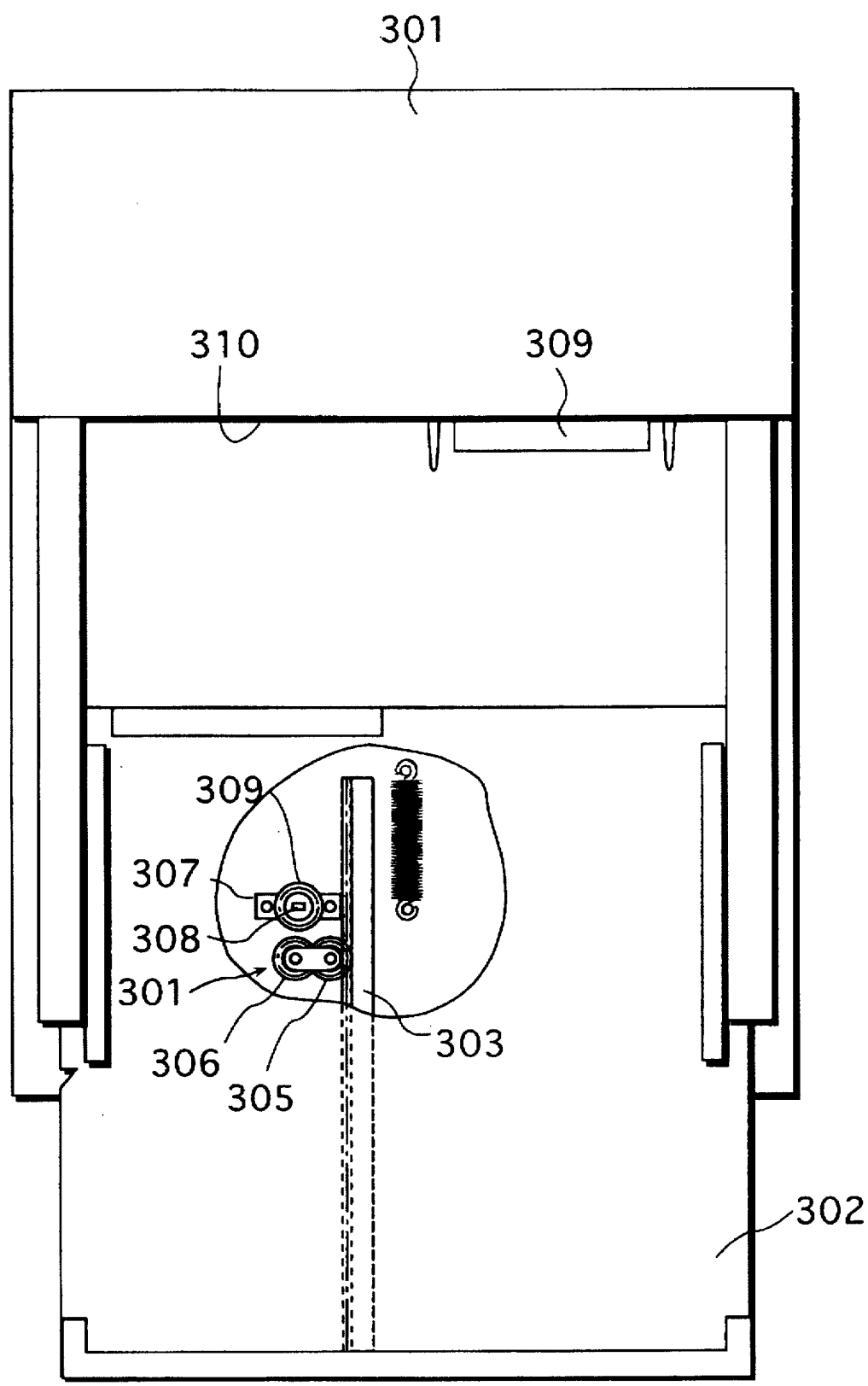
FIG. 34 is a plan view of a modified damping mechanism.
Figure 35:
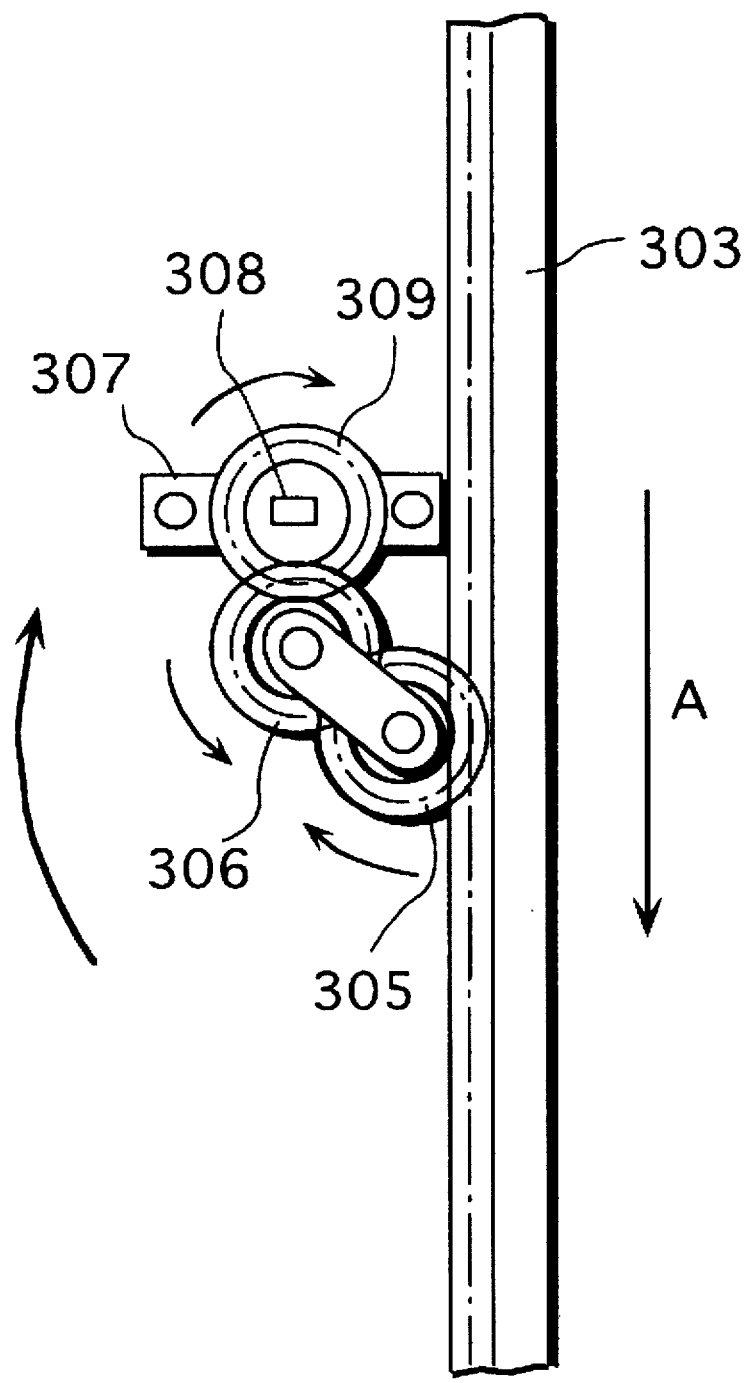
FIG. 35 is a plan view of the damping mechanism shown in FIG. 34 in operation.
Figure 36:
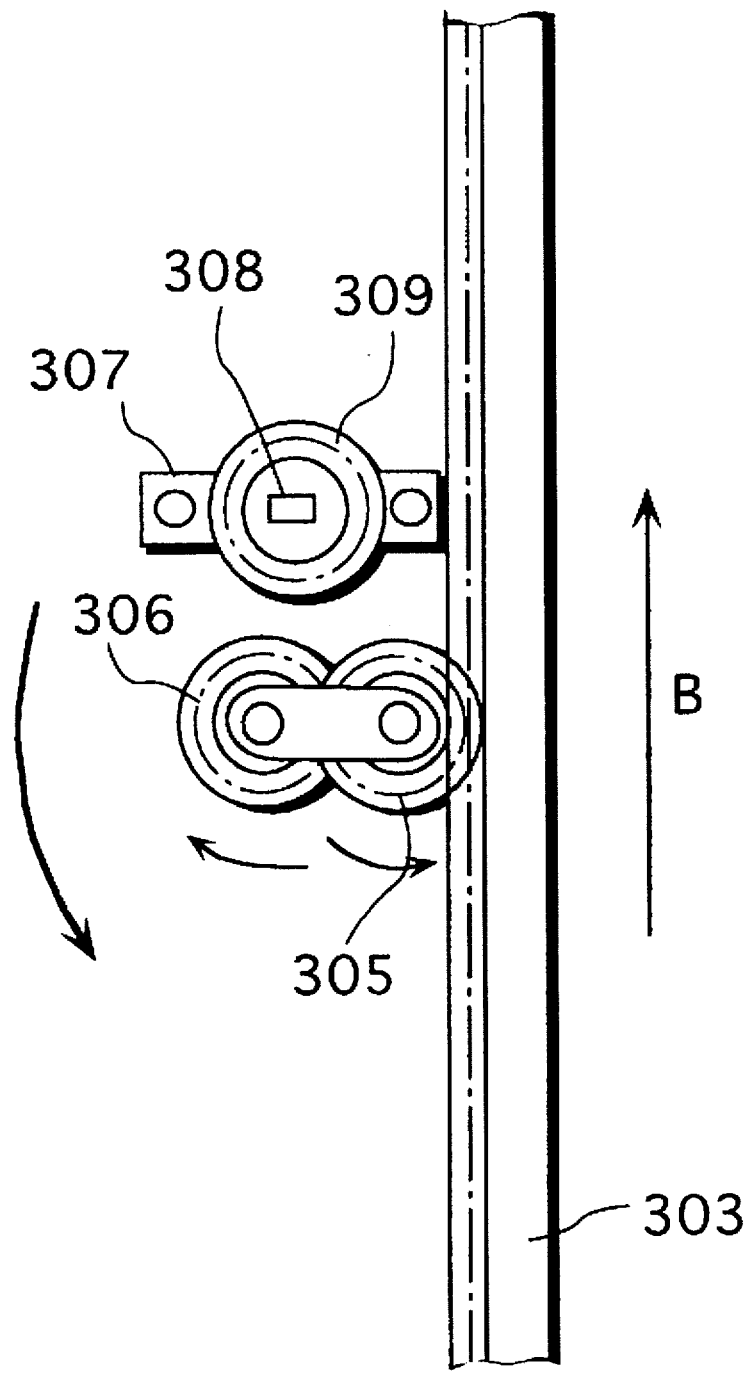
FIG. 36 is a plan view of the damping mechanism shown in FIG. 34 while not operating.

As shown in FIGS. 34–36, it is also preferable that the damper system 301 be provided with a longitudinal rack 303 fixed to the bottom of the table 302, an intermediate gear 305 pivoted on the primary box 304 around a vertical axis and engaged with the rack 503, a planetary gear 306 engaged with the intermediate gear 305, a rotary damper 307 fixed on the primary box 504 behind the intermediate gear 305, and the planetary gear 306, and a damper gear 309 fixed with the rotary shaft 308, so that it is engaged with the planetary gear 306 which is moved to behind the intermediate gear 305 when the table 302 slides forward and is disengaged from it when the table 302 slides backward.

In this case, the rack 303 is moved to the direction shown by an arrow A in FIG. 35, i.e., toward forward, when the table 302 is moved forward, and the intermediate gear 305 rotates to clockwise. The result is that the planetary gear 306 is moved to clockwise around the intermediate gear 305 to be engaged with the damper gear 309, and the rotary damper 307 damps the forward motion of the table 302 effectively.

On the contrary, when the table 302 is moved backward, the rack 303 is moved to the direction shown by an arrow B as shown in FIG. 36, that means backward, and the intermediate gear 305 rotates to counter-clockwise. As a result, the planetary gear 306 is moved counter-clockwise about the intermediate gear 305, and the planetary gear 306 is disengaged from the damper gear 309, and the rotary damper becomes ineffective.

In FIG. 34, the numeral 309 designates a half of a connector, and 310 designates a vertical wall.

Figure 40:
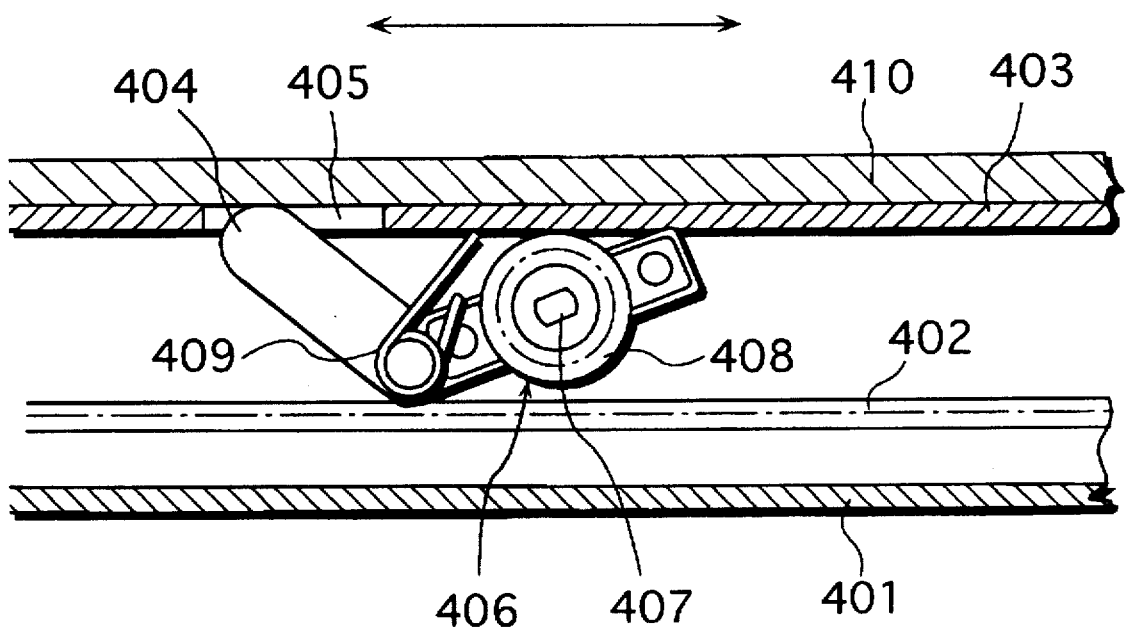
FIG. 40 is a side view of the damping mechanism shown in FIG. 37 while not operating.
Figure 41:
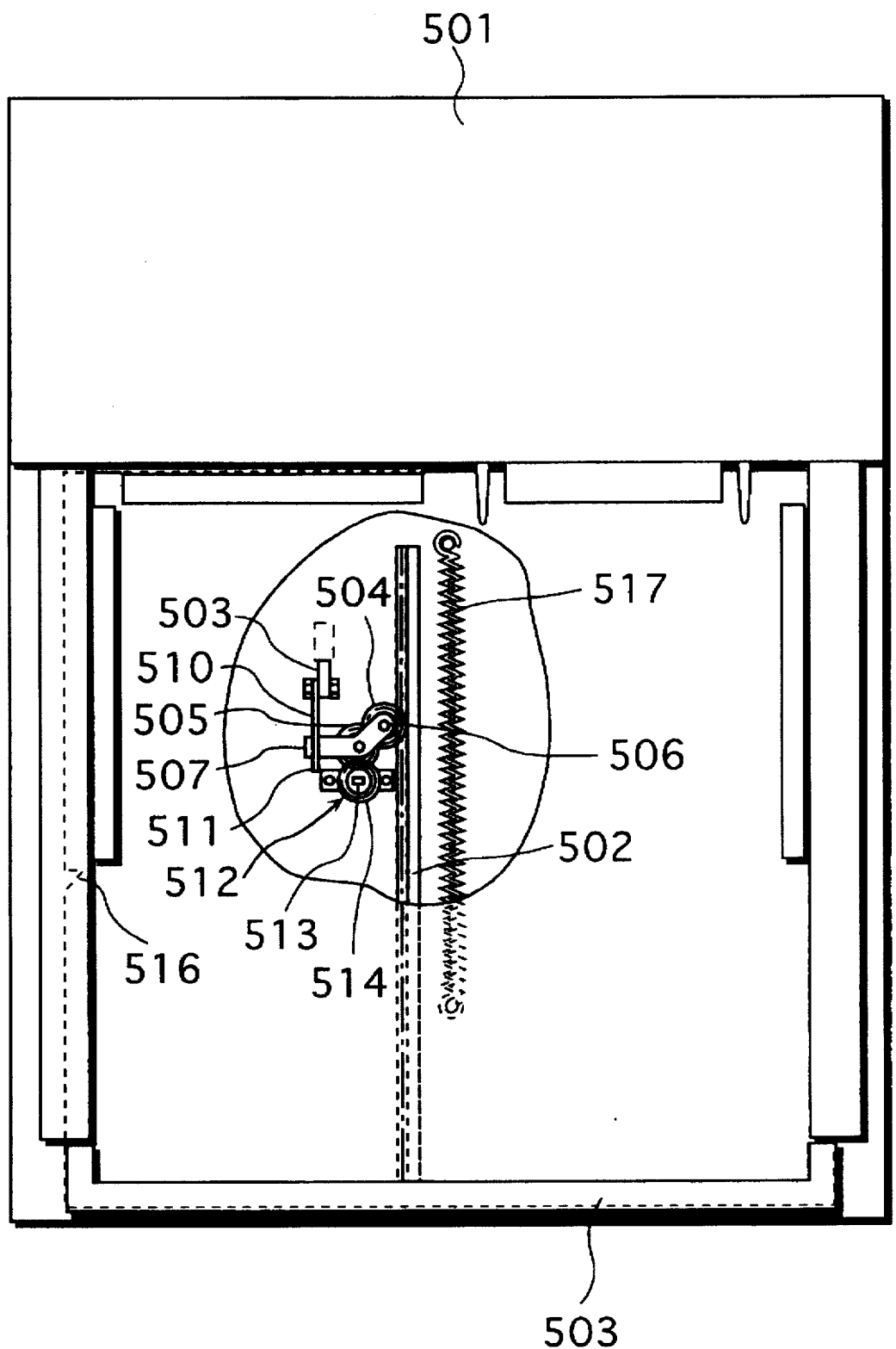
FIG. 41 is a plan view of an other preferred embodiment of the present of the present invention with a still further modified damping mechanism.

According to another damper system adapted to this invention, as shown in FIGS. 37–40, the primary box 401 is provided with a longitudinal rack 402 thereon, and a sensing lever 404 pivoted under the table 403 rotatable about a lateral axis. The table 403 is provided with an aperture 405 to admit the other end of sensing lever 404 passing through, and the sensing lever 404 supports a rotary damper 406 and a damper gear 408 fixed with the rotary shaft 407. The sensing lever 404 is biased by a torsion spring 409 to the position where the top is projected over the table 403 through the aperture 405 and the damper gear 408 is engaged with the rack 402. And, as shown in FIG. 40, when a PC 410 is mounted on the table 403, one end of the sensing lever 404 is depressed by the weight of PC 410 to the upper face of the table 403 and the damper gear 408 is removed from the rack 402.

According to this damper system, if a PC 410 was mounted on the table 403 the damper gear 408 is removed from the rack 402 and the rotary damper 406 becomes ineffective. But if the table 410 was vacant, the damper gear 408 is engaged with the rack 402, and the rotary damper 406 is effective to damp the longitudinal motion of the table 403. Therefore, it is preferable to intermediate the rotary shaft 407 and damper gear 408 with a one way clutch, in order to make the damper system effective only when the vacant table 403 is moved forward.

Figure 37:
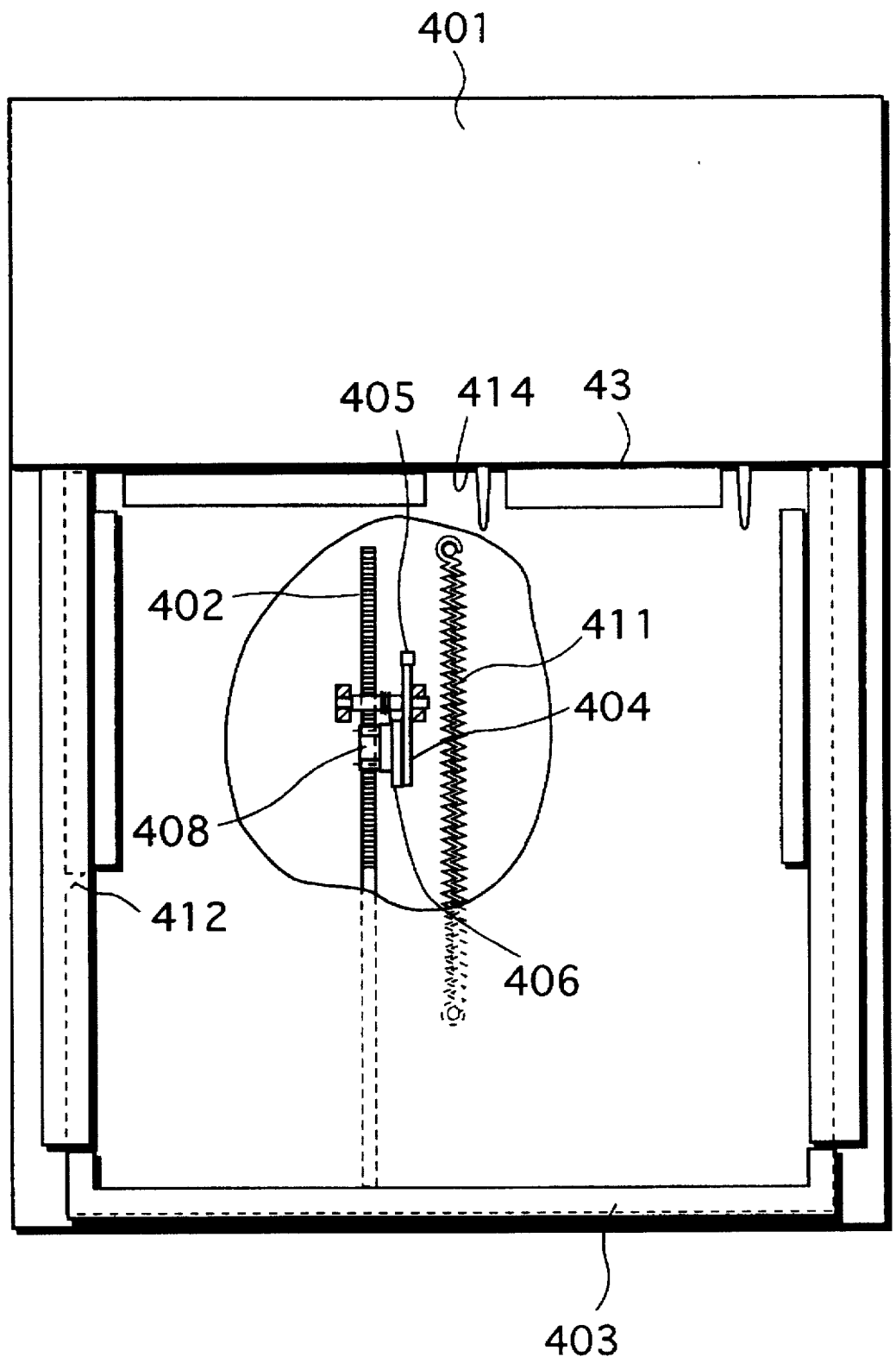
FIG. 37 is a plan view of an other preferred embodiment of the present of the present invention with further modified damping mechanism.
Figure 38:
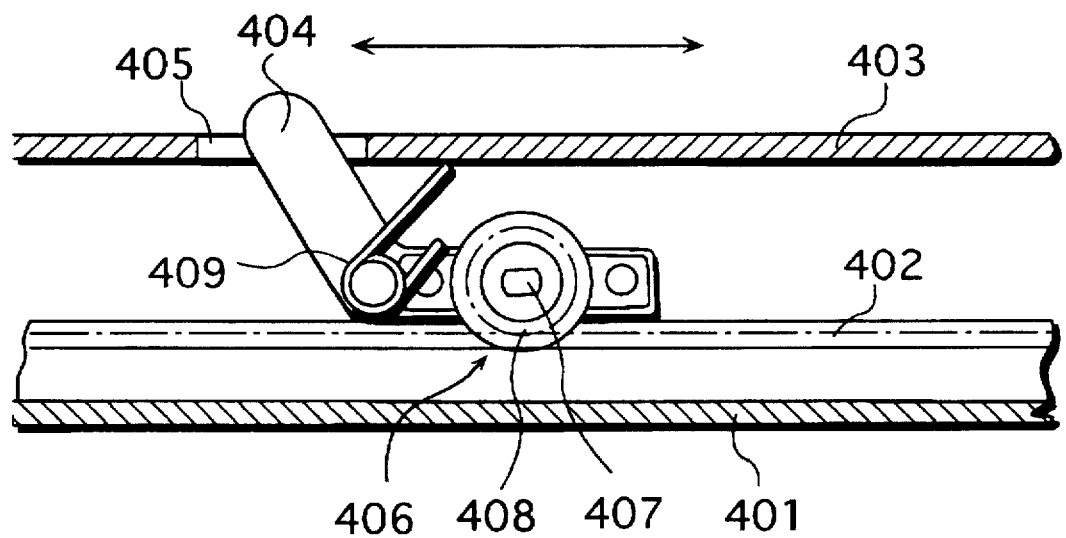
FIG. 38 is a side view of the damping mechanism shown in FIG. 37 in operation.
Figure 39:
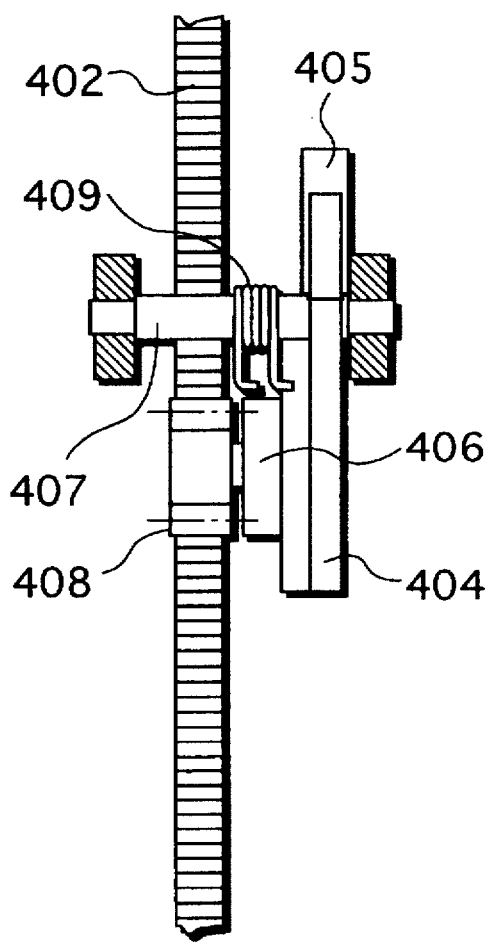
FIG. 39 is a plan view of the damping mechanism shown in FIG. 37 while not operating.

In FIG. 37, numeral 411 designates a traction spring, 412 designates a stopping means, 413 designates a half of a connector, 414 designates a vertical wall respectively.

Another damper system which is adaptable to the present invention is provided with a longitudinal rack 502 fixed on a primary box 501, an intermediate gear 504 pivoted under the table 503 and engaged with the rack 502, and a planetary gear 505 engaged with the intermediate gear 504, and a planetary gear 505 is supported at the middle of a stop lever 507 pivoted by the shaft 506 of the intermediate gear 504 as shown in FIGS. 41–47.

Figure 45:
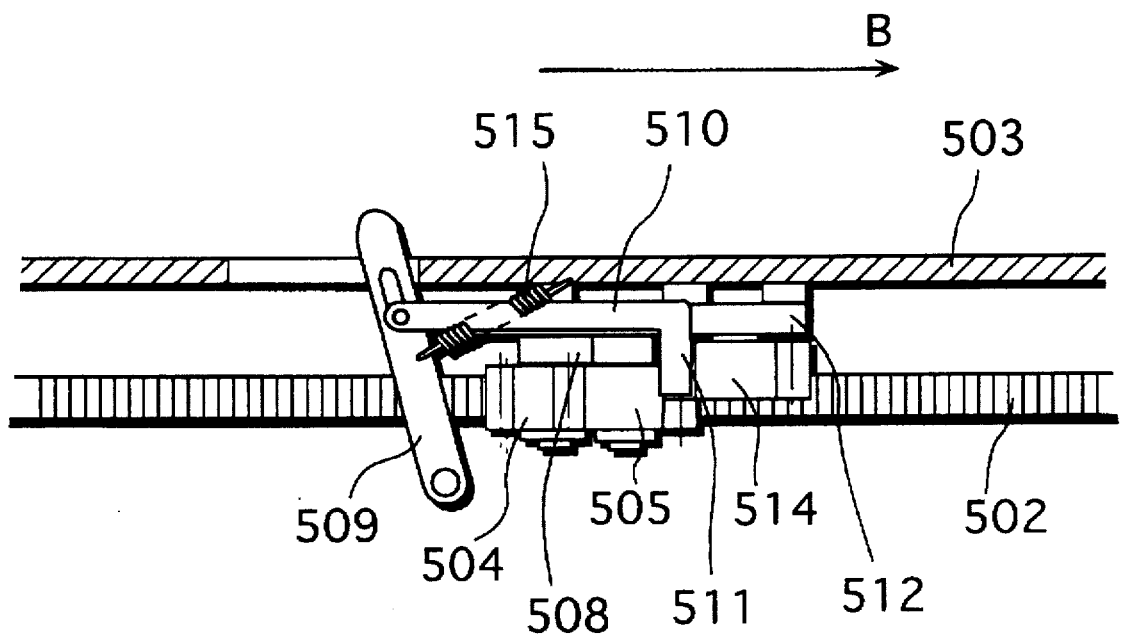
FIG. 45 is a side view of the embodiment shown in FIG. 41 when the vacant table is moving forward.
Figure 46:
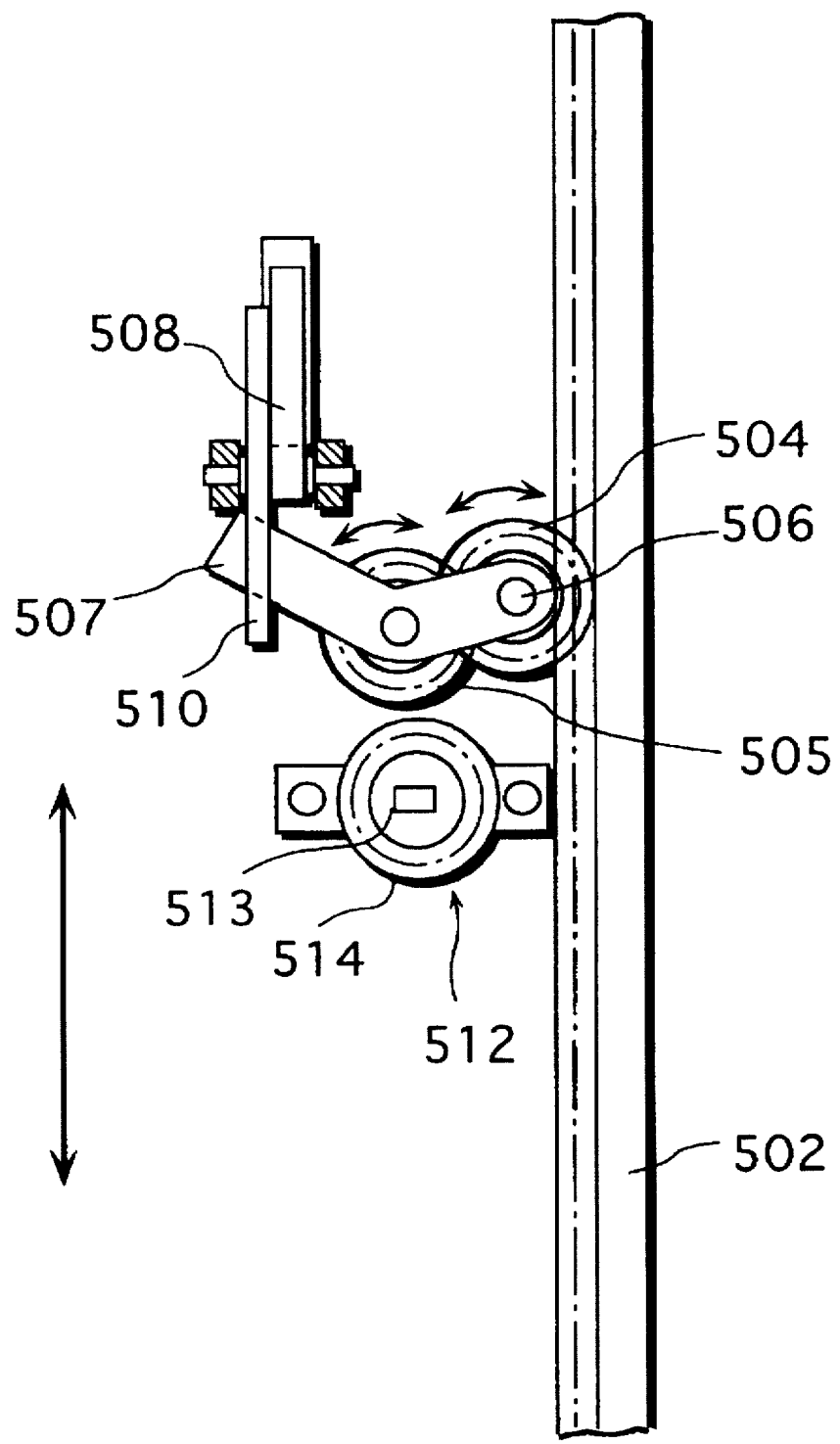
FIG. 46 is a plan view of the damping mechanism shown in FIG. 41 when the table is loading an equipment on it.
Figure 47:
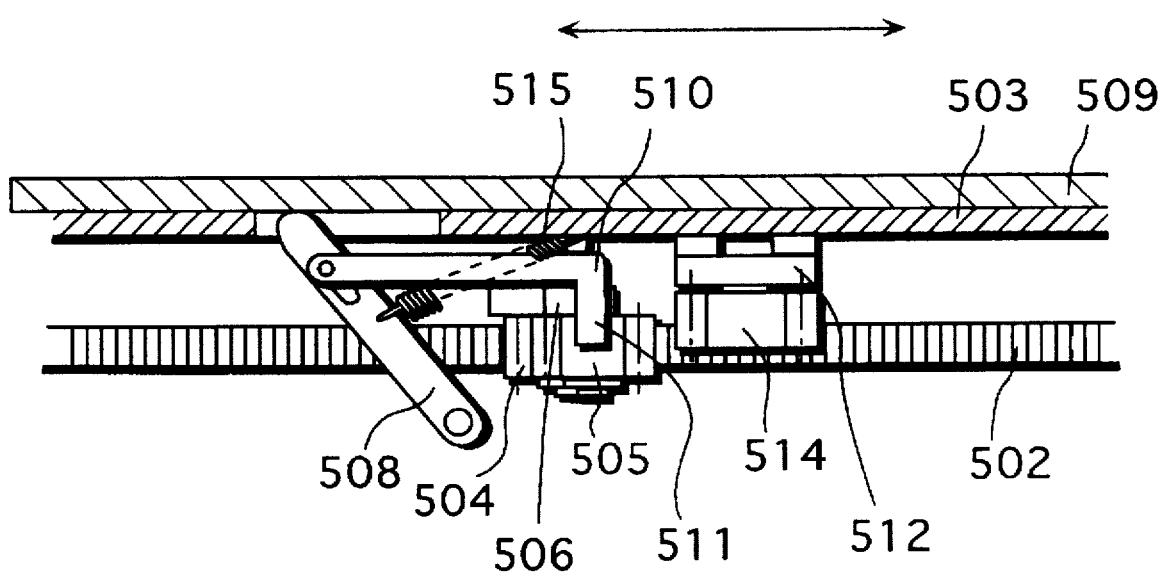
FIG. 47 is a side view of the damping mechanism shown in FIG. 41 when the table is loading an equipment on it.

A sensing lever 508 is pivoted under the table 503 to rotate about a right shaft between a projecting position where the top of the sensing lever 508 is projected over the table 503 as shown in FIG. 45 and a detecting position where this lever 508 is tilted by a PC 509 backward to be depressed its top to the top of the table 503 as shown in FIG. 47. A rear end of a stopper lever 510 is connected with the middle part of the sensing lever 508. The front end 511 of this stopper lever 510 is hook nosed downward, and the stop lever 507 is movable freely between the end of the sensing lever 508 and under the stopping lever 510.

A rotary damper 512 is fixed with the lower face of the table 503 in front of the intermediate gear 504, and a damper gear 5 14 with which the planetary gear 505 is engaged and disengaged is fixed to the rotary shaft 513 of the rotary damper 512.

Figure 44:
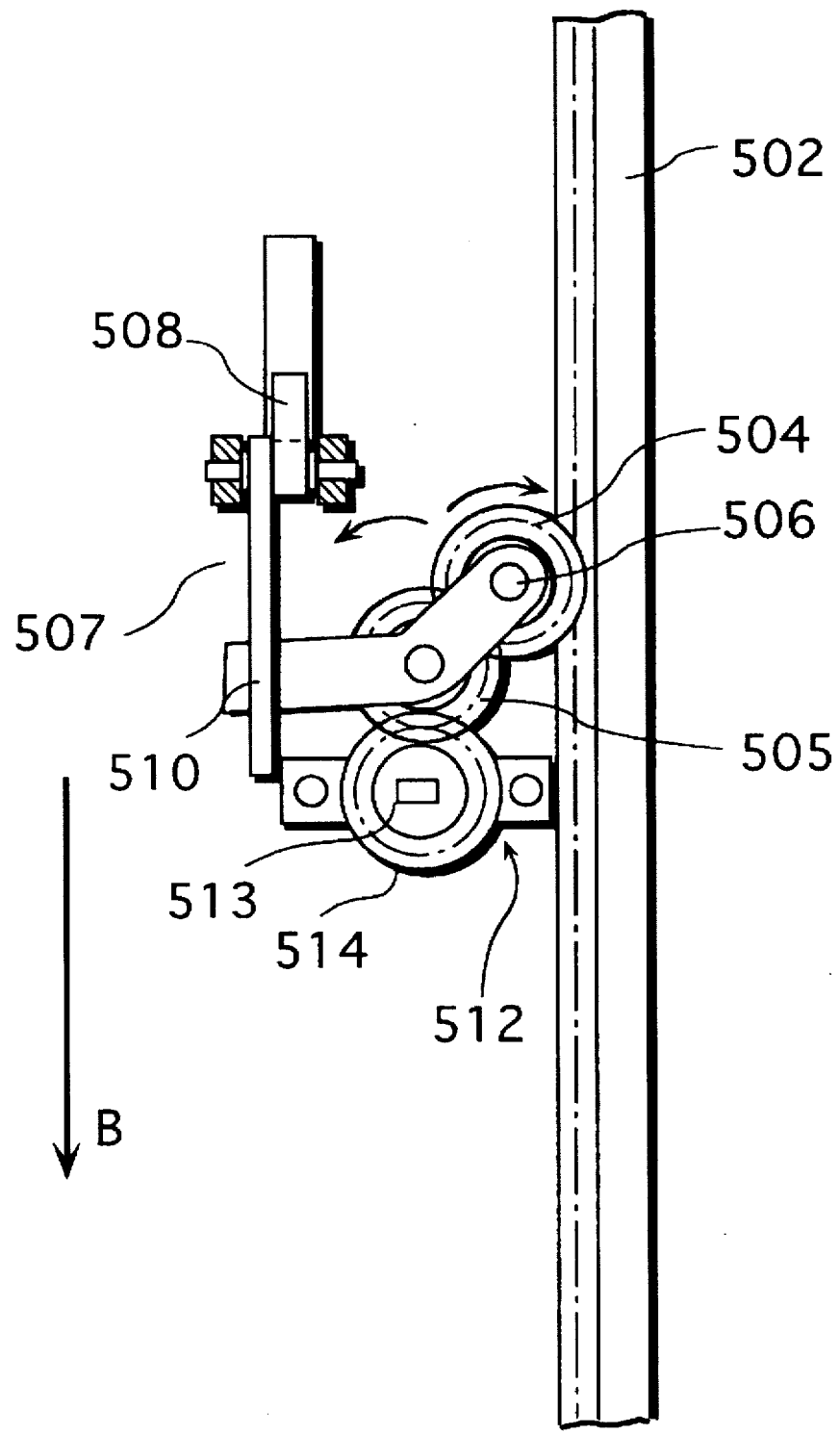
FIG. 44 is a plan view of the damping mechanism shown in FIG. 41 when the vacant table is moving forward.

The sensing lever 508 is biased by a traction spring 515 to the projecting position, to be located in the projecting position when the table 503 is vacant, and the front end 511 of the stopper lever 510 is located more forward than the position of the stop lever 507 where the planetary gear 505 is engaged with the damper gear 514, as shown in FIG. 44. Therefore, the planetary gear 505 is freely moved around the shaft 506 of intermediate gear 504 to freely engage and disengage with the damper gear as shown in FIGS. 42 and 44.

Figure 42:
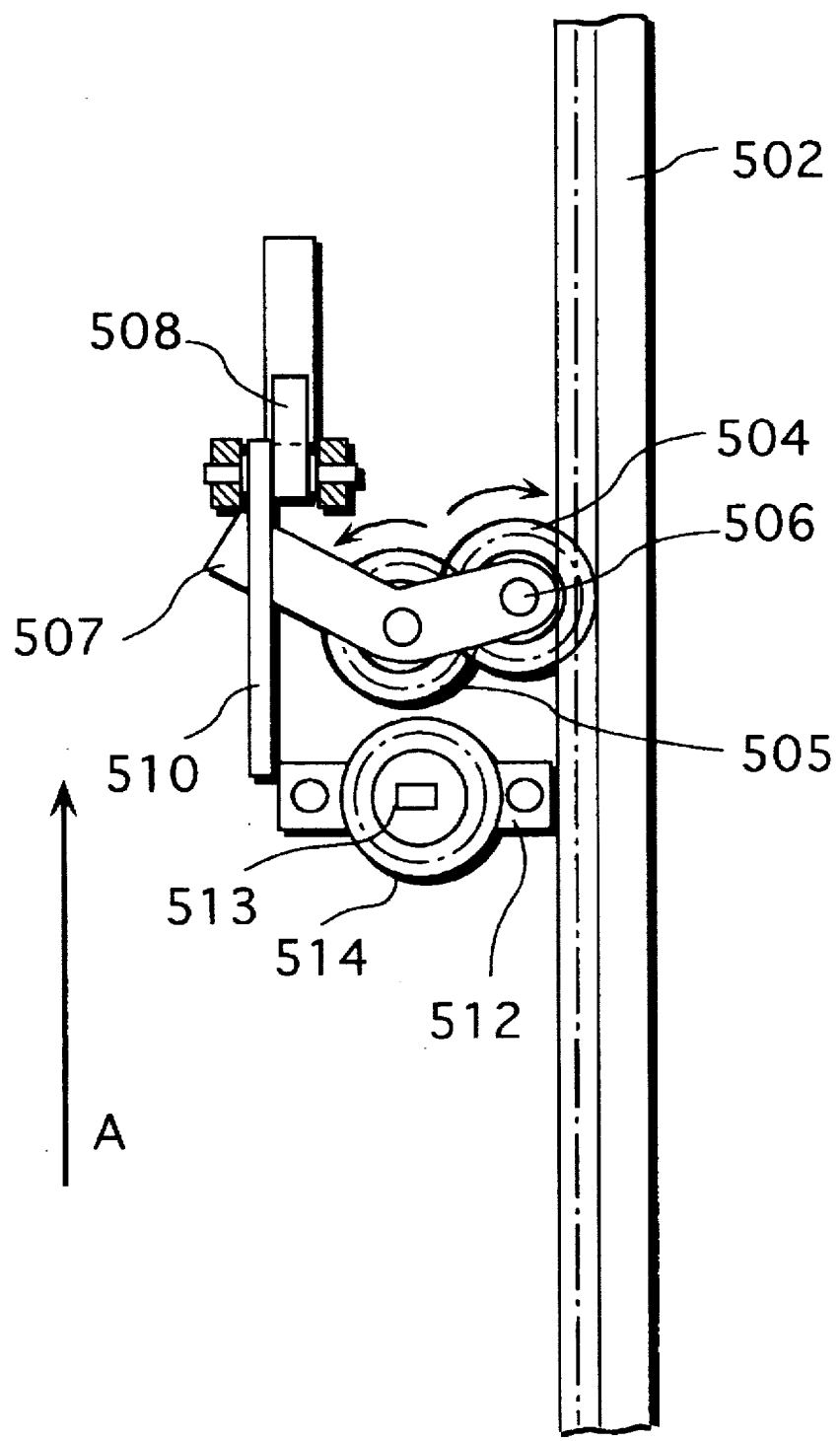
FIG. 42 is a plan view of the damping mechanism in FIG. 41 when the vacant table is moving backward.
Figure 43:
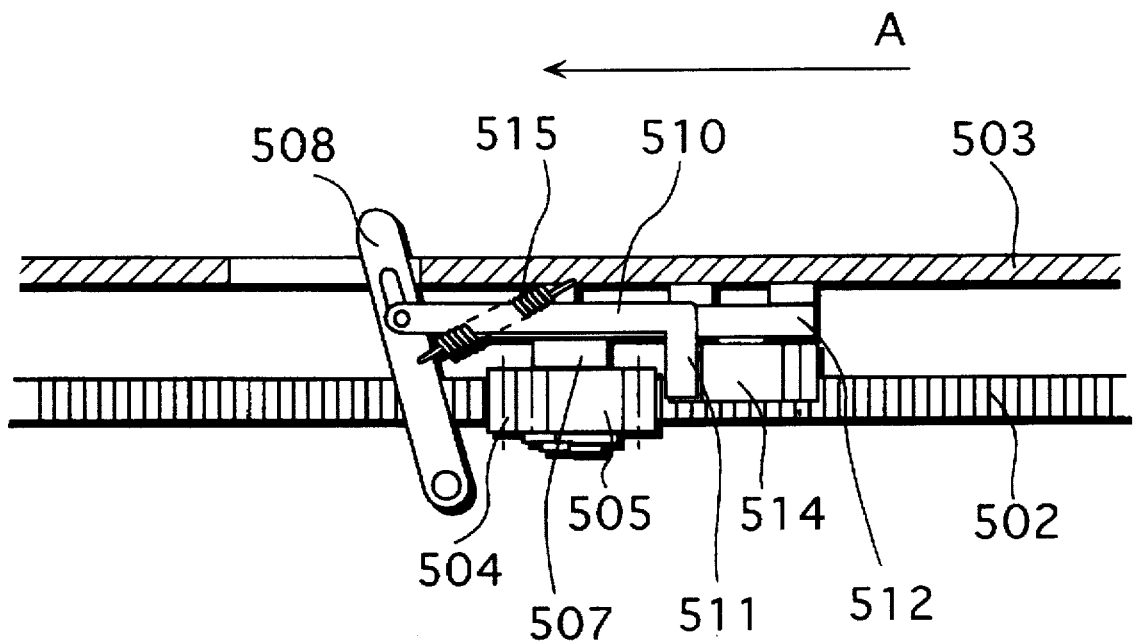
FIG. 43 is a side view of the damping mechanism shown in FIG. 41 when the vacant table is moving backward.

When the vacant table 509 is pushed back to the loading position, the planetary gear 505 is moved in pushing direction designated by an arrow A in FIG. 42 from the damper gear 514 and disengaged with it. Thus, the table 503 can be pushed easily without the resistance of the rotary damper 512.

On the contrary, when the vacant table 503 is moved from the loading position to the foremost position by the force of traction spring 517 after releasing the stopping means 516, the planetary gear 505 is engaged with the damper gear 514 and the rotary damper 512 is effective to damp the force for forward motion of the table 503 as shown in FIG. 44. As a result, the force by which the projection projected on the lower face of the table 503 and transmitted to the stopper projected on the primary box 501 is decreased to prevent the damages of the projection, stopper, the table 503, and the primary box 501.

When a PC 509 is mounted on the table 503, a top of the sensing lever 508 is tilted backward by the weight of the PC and the front end 511 of the stopper lever 510 is located behind the position of the stop lever 507 where the planetary gear 505 is engaged with the damper gear 513. Therefore, the planetary gear 505 is restrained from becoming disengaged with the damper gear 514, and the damper system is kept ineffective, so that the table 503 with a PC 509 will be easily pushed back to the loading position without the resistance of the damper system, and after that the table 503 with a PC 509 is pushed out from the loading position to the disconnecting position by the thrusting mechanism, the table 503 and the PC 509 are easily pulled forward to the foremost position with the aid of the traction spring 517 which biases the table 503 forward.

Figure 48:
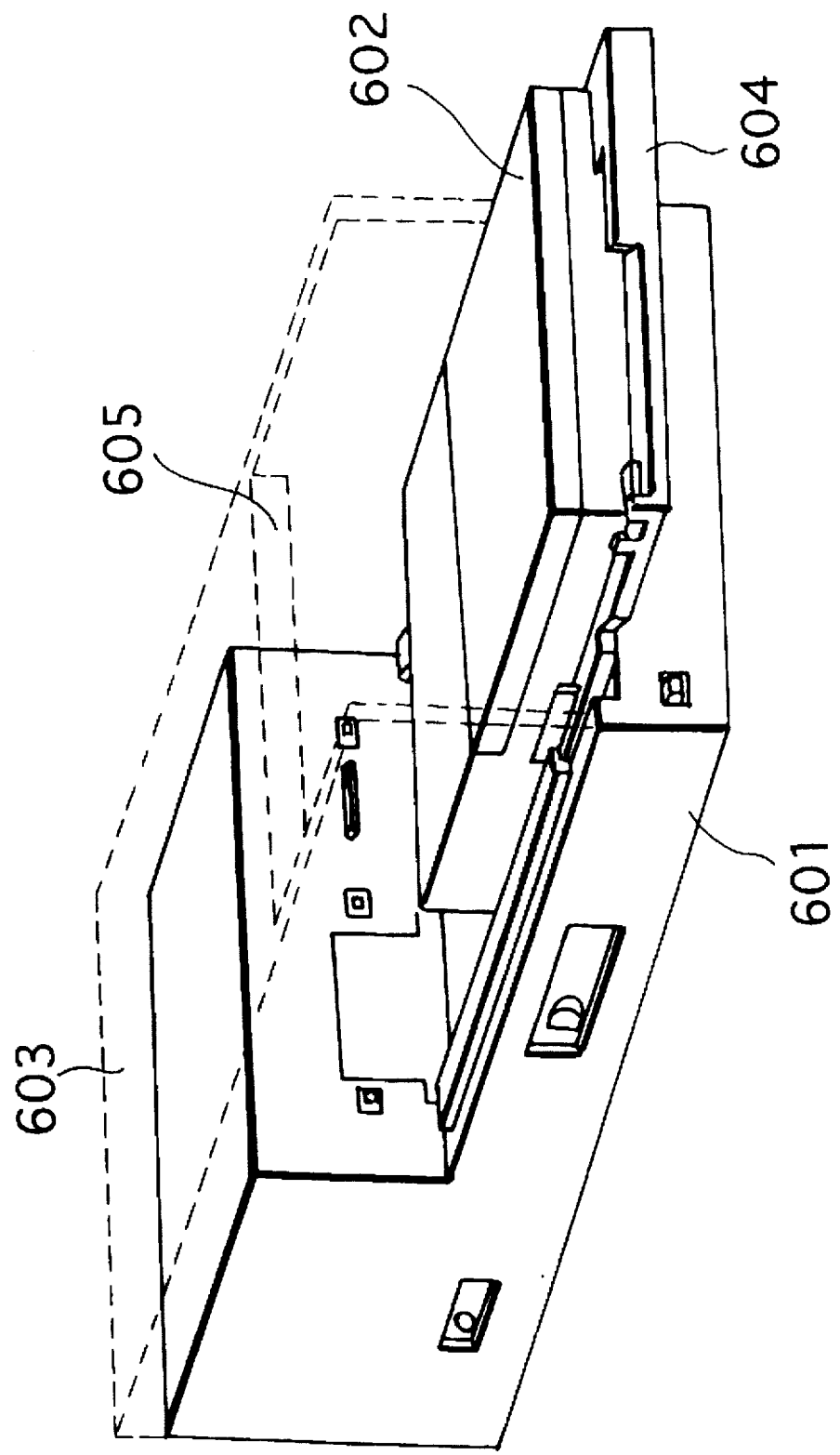
FIG. 48 is a perspective view of another preferred embodiment of the present invention with a CRT table.

Finally, when the installation of CRT is required for each embodiments above-mentioned, it is preferable to mount a CRT table 603 covering partially or wholly over the primary box 601 and a PC 602 loaded to the primary box 601 as shown in FIG. 48. In this case, in order to make the mounting to the table 604 and remounting from it of the PC 602 easy, it is preferable that the front edge 605 of the CRT table 603 be preferably located over the rear end of the PC 602 on the table 604 positioned at its foremost position.

The CRT table 603 is optionally equipped, and the primary box 601 and the CRT mounted on the CRT table 603 may be connected, with a usual interface cable having a pair of connecter halves at both ends of it. But when the weight of the CRT is light, it is possible to connect a CRT on the CRT table 603 and the box 601 directly with a connector whose halves are separately installed to the primary box 601 and the CRT.

Although the present invention has been described and illustrated in detail, it is clearly understood that the same is by way of illustration and example only and is not to be taken by way of limitation, the spirit and scope of the preset invention being limited only by the terms of the appended claims.

What is claimed is:

1. A docking station box for functional expansion of portable electronic equipment, said box comprising:
   a horizontal table on which a portable electronic equipment is to be mounted;
   a vertical wall at the rear of said table;
   one half part of a connector fixed on said vertical wall for connection to another half part of the connector on the equipment, the connector halves to be connected by mounting the equipment on said table and then moving the equipment backward toward said vertical wall, and to be disconnected by moving the equipment forward;
   at least one hook with a head, said at least one hook being rotatably mounted to said box to be rotated between a releasing position with said at least one hook under said table and a hooking position in which the head of said at least one hook projects above said table;
   operating means for manipulating said at least one hook;
   an aperture in said table corresponding to the location of a said at least one hook for letting the hook move therethrough, between said releasing position and said hooking position;
   a manipulation member for manipulating said operating means from outside of the body of said box; and
   a restraining means for restraining said manipulation member at a position so that said at least one hook is located in the releasing position.

2. The docking station box according to claim 1, further comprising:
   a locking-up means for said operating means for locking-up said restraining means in a working position with said at least one hook in the hooking position.

3. The docking station box according to claim 1, further comprising:
   a thrusting mechanism in said box which thrusts the equipment from a loading position in which the connector parts are connected to a disconnecting position in which the connector parts are disconnected, said thrusting mechanism being actuated by said manipulating member.

4. The docking station box according to claim 3, further comprising:
   at least one aperture through said vertical wall;
   at least one pusher inserted in a said aperture and being slidable in the front and rear directions of the box from a waiting position in which a front end of said at least one pusher is substantially flush with the front surface of said vertical wall to a projecting position in which the front end of said at least one pusher projects in front of said half part of said connector on said vertical wall;
   a shaft supported on a part of the body of said box behind said vertical wall, said shaft being rotatable around a lateral axis, said shaft having at least one crank arm which connects said at least one pusher to the shaft, and
   a manipulating member for manipulation from outside of the body of said box for actuating said thrusting mechanism.

5. The docking station box according to claim 4, further comprising:
   a plurality of apertures through said vertical wall spaced in a lateral direction;
   a said at least one pusher and crank arm set each corresponding to a respective one of said apertures; and
   said half part of said connector of said box being located between a pair of said apertures.

6. The docking station box according to claim 4, wherein said thrusting mechanism and said hook operating means are interlocked with each other, said at least one hook being moved from the releasing position to the hooking position after said pusher of said thrusting mechanism is moved from the projecting position to the waiting position, and said pusher of said thrusting mechanism being moved from the waiting position to the projecting position after said at least one hook is moved from the hooking position to the releasing position.

7. The docking station according to claim 1, further comprising:
   a half part of at least one other connector supported by a retraction mechanism provided in the body of the box, said retraction mechanism moving said at least one other connector back from a utilizing position arranged to correspond to a said half part of a connector provided on said box vertical wall at proper intervals in longitudinal and lateral directions to a position which is at least one of under said table and behind said vertical wall.

8. The docking station box according to claim 1, further comprising:

means for detecting the loading of the electronic equipment on said table, a power switch for starting the electronic equipment and providing a power switch signal, means for supplying the body of said box with signals to be supplied to the electronic equipment through the connected connector parts which are required for starting the electronic equipment when said power switch is operated to provide the power switch signal and require starting when the electronic equipment is loaded on said table, and means for starting which receives authorization signals for starting from the body of said box through said connected connector parts after the power switch signal is supplied from the equipment;

a lock mechanism; and a security means which outputs System On signals indicating the system is on when it receives the power switch signals from the equipment while said lock mechanism is unlocked.

9. The docking station box according to claim 8, further comprising:

a switching circuit having a switch which is turned on and off due to interlocking with said lock mechanism and an output terminal connected to ground by said switch, said switching circuit being controlled with the power switch signals so as to be turned on and off and which outputs high-level signals in an on condition;

a dual input OR circuit, one of whose input terminals is connected with said switching circuit; and an AND circuit, one of whose input terminals is connected with an output terminal of said OR circuit and the other of whose inputs is supplied with power switch signals, said AND circuit supplies the signals from an output terminal as said System On signals to the other input terminal of said OR circuit which are provided to said security means.

10. A docking station box for functional expansion of portable electronic equipment, said box comprising:

a horizontal table on which portable electronic equipment is mounted, said table having at least one aperture;

a vertical wall on said box;

one half part of a connector for connecting to said equipment being fixed on said vertical wall to receive another half part of said connector on said electronic equipment mounted on the table;

said table being slidable in a direction in which the connector of the equipment is inserted or pulled out;

said table provided with at least one means to decide the position of said equipment as being on said table, said box having at least one aperture for letting a hook pass through to be supported by the body of the box and slidable in a direction in which the connector of the equipment is inserted or pulled out;

a hook with a head, said hook pivotally supported by the body of said box in a position under said aperture when said table is located in a loading position in which the equipment mounted on the table is to be connected to the connector part on the body of said box; and a spring on the body of said box which biases said hook toward a hooking position in which the head of said hook projects above said table, said hook head being located in the hooking position when the table is in the loading position and being pushed backward to a releasing position with said hook under said table by a rear edge of said aperture when the table is moved forward; and at least one traction spring provided between said table and body of said box which biases said table forward.

11. The docking station box according to claim 10, further comprising:

means for determining the presence of portable electronic equipment on said table so that the equipment cannot be moved in a direction in which said connector parts can be disconnected, as well as to be skewed against the direction of movement provided for said table.

12. A docking station box according to claim 10, further comprising:

a stopper which stops said table in a predetermined foremost position on said box.

13. The docking station box according to claim 10, further comprising:

a stopping means on the body of said box and said table for restraining said table in said loading position; and a releasing means on the body of said box for releasing said table from said stopping means.

14. The docking station box according to claim 10, wherein a half part of at least one other connector on the body of said box is supported by a retraction mechanism to move back from said half part of said at least one other connector between a utilizing position above the table which corresponds to the half part of the connector provided on the box vertical wall at proper intervals in longitudinal and lateral directions to and a retracted position which is at least one of under the table and behind said box vertical wall; and a number of means with half parts of connectors on said box, at least one of which corresponds to the connector half part of the equipment on said table.

15. The docking station box according to claim 14, further comprising:

a manipulation member for operating said retraction mechanism from outside of the body of said box;

said retraction mechanism comprises a shaft rotatably supported around a lateral axis, and at least one crank arm, one end of which is fixed to said shaft, and the other end of which supports the half part of the at least one other connector.

16. The docking station box according to claim 14, further comprising:

a first detecting means in front of said half part of said at least one other connector for detecting the type of equipment mounted on said table;

a second detecting means for detecting a half part of said at least one other connector when located in the foremost position on said table; and an information means for indicating correspondence between the detected equipment and the detected half part of the other connector when they correspond with each other.

17. The docking station box according to claim 16, wherein
- said table is provided with a stopper which in one position projects above said table to determine an equipment of a first size and in another position is depressed to an upper surface of the table by the weight of a second and larger size equipment mounted on said table; and
- said first detecting means detects the type of the electronic equipment mounted on the table by detecting the positional height of said stopper.

18. The docking station box according to claim 14, further comprising:
- a thrusting mechanism which thrusts the equipment on said table from the loading position, in which any one type of equipment and the body of said box are connected by corresponding connector halves, to a disconnecting position in which said connector halves are disconnected.

19. The docking station box according to claim 18, further comprising:
- a plurality of apertures each corresponding to the half part of a said at least one other connector through the vertical wall at intervals in a lateral direction; and
- a plurality of holders each corresponding to a half part of a said at least one other connector which can move backward and be supported by said retraction mechanism, said plurality of holders being located by the retraction mechanism above said table when a half part of at least one other connecter is located in said utilizing position, and at least one of under the table and behind the vertical wall when a half part of said at least one other connecter is located in said retracted position, said plurality of holders being supported by said retraction mechanism to move between the utilizing position which is above said table and the retracted position which is at least one of under the table and behind the vertical wall;
- a plurality of supplementary pushers for the corresponding half parts of said at least one other connector which can move backward and are supported by said holders so as to be slidable in the longitudinal direction between a waiting position, in which the front end of said supplementary pushers are substantially flush with the front surface of said holders in the utilizing position, and a projecting position in which the front end of said supplementary pushers project forward from the front surface of the half parts of said at least one other connector supported by the retraction mechanism;
- a plurality of springs corresponding to that of the half parts of the at least one other connector to bias the supplementary pushers toward the waiting position;
- a plurality of primary pushers each corresponding to that of the half parts of the at least one other connector which extend through said apertures and are movable in the longitudinal direction of said primary pusher from a waiting position, in which the front end of each of said plurality of primary pushers is substantially flush with the vertical wall, to a projecting position in which said front ends project forward from the front end of the half part of said connector on said vertical wall;
- a manipulating member operable from outside of the body of the box for operating said thrusting mechanism;
- a shaft rotatably supported on the back of the vertical wall; and
- a plurality of crank arms of a number corresponding to that of the half parts of the at least one other connector, the crank arms connecting the respective primary pushers with the shaft
- said plurality of primary pushers being located behind said supplementary pushers in the utilizing position in order to move said supplementary pushers from the waiting position to the projecting position when the primary pushers are moved from the waiting position to the projecting position.

20. The docking station box according to claim 18, wherein
- the apertures and at least one of the primary and supplementary pushers are located on both half parts of the connectors.

21. The docking station box according to claim 10, further comprising:
- a thrusting mechanism which thrusts said table or the equipment mounted on the table from the loading position to a disconnecting position in which the connector half parts are disconnected.

22. The docking station box according to claim 21, further comprising:
- a stopping means for restraining said table at the loading position; and
- a releasing means which releases the table from the stopping means wherein
- said thrusting mechanism is interlocked with said stopping means and releasing means to restrict the stopping means in a working condition operation when the table is in the loading position, the thrusting mechanism switching the stopping means to be out of operation just before the table starts to move from the loading position to the disconnecting position.

23. The docking station box according to claim 10, further comprising:
- at least one damper attached to the body of said box or to the table to damp forward movement of said table.

24. The docking station box according to claim 23, wherein
- said damper is supported on either of a surface of the body of the box facing said table or a bottom surface of the table, said damper comprising a rotary shaft and a rotary damper with a damper gear fixed to the rotary shaft, and a rack gear which engages with said damper and extends in front and rear directions on opposite sides of the rotary damper.

25. The docking station box according to claim 24, wherein said damper system further comprises:
- a one-way clutch between said damper gear and rotary shaft of the damper.

26. The docking station box according to claim 23, further comprising:
- a rack gear extending in front and rear directions on a surface of the body of the box facing a lower surface of said table;
- a sensing lever pivoted around a lateral axis on said table;
- an aperture in said table through which the top end of the sensing lever is accessible to move up and down,
- a spring which biases said sensor lever with the top end thereof projecting above said table, a rotary damper supported by the other end of said sensing lever, and
- a damper gear fixed to a rotary shaft of the rotary damper and engaged with said rack gear when said top end of said sensing lever projects above said table.

27. The docking station box according to claim 26, wherein said damper further comprises:

a one-way clutch between said damper gear and said rotary shaft of said damper.

28. The docking station box according to claim 23, further comprising:

a rack gear extending in front and rear directions of the box on a surface of the body of the box facing a lower surface of said table;

an intermediate gear engaged with one end of the rack gear;

a planetary gear engaged with the intermediate gear;

a rotary shaft; and a rotary damper fixed to the rotary shaft, said rotary damper having a damper gear engaged with said planetary gear when it rotates in one direction around the axis of said intermediate gear, and supported by said upper surface of the body of said box or a lower surface of said table.

29. The docking station box according to claim 23, further comprising:

a rack gear extending in front and rear directions of said box on a surface of the body of the box facing a lower surface of said table;

a sensing lever rotatably mounted on said table;

an aperture for said table through which a top end of the sensing lever moves between above and under the table;

a spring which biases the sensor lever to have its top end project above said table, a rotary damper fixed on a lower surface of said table, said rotary damper having a rotary shaft and a damper gear fixed to the rotary shaft, an intermediate gear on the body of said box in back of the rotary damper, the damper gear engaging with said rack gear, a planetary gear engaged with the intermediate gear in back of said rotatable damper and the damper gear, and a retraining mechanism driven by said sensing lever which disengages said planetary gear and said damper gear when the sensing lever is depressed to the upper surface of said table to allow the planetary gear to move to a position in which said planetary gear and said damper gear are engaged when the sensing lever projects above the upper surface of said table.

30. The docking station box according to claim 10, further comprising:

a CRT mounting board on an upper side of the body of said box which supports a CRT.

31. The docking station box according to claim 30, wherein the table on which the electronic equipment is mounted is provided on the body of the box slidable in back and forth directions; and the front edge of said CRT mounting board being located at the rear edge of said table when said table is in its foremost position.

* * * * *